United States Patent
Lanka et al.

(10) Patent No.: US 11,971,841 B2
(45) Date of Patent: Apr. 30, 2024

(54) LINK LAYER-PHY INTERFACE ADAPTER

(71) Applicant: Intel Corporation, Santa Clara, CA (US)

(72) Inventors: Narasimha Lanka, Dublin, CA (US); Swadesh Choudhary, Mountain View, CA (US); Mahesh Wagh, Portland, OR (US); Lakshmipriya Seshan, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 661 days.

(21) Appl. No.: 17/008,542

(22) Filed: Aug. 31, 2020

(65) Prior Publication Data

US 2020/0394150 A1    Dec. 17, 2020

Related U.S. Application Data

(60) Provisional application No. 63/028,412, filed on May 21, 2020.

(51) Int. Cl.
   G06F 13/42    (2006.01)
   G06F 13/28    (2006.01)

(52) U.S. Cl.
   CPC ........ *G06F 13/4286* (2013.01); *G06F 13/287* (2013.01); *G06F 13/4226* (2013.01)

(58) Field of Classification Search
   CPC ........ G06F 13/40; G06F 13/42; G06F 13/287; G06F 13/4286; G06F 13/4273; G06F 13/4027; G06F 3/0601; H04L 69/24
   See application file for complete search history.

(56) References Cited

U.S. PATENT DOCUMENTS

| | | | |
|---|---|---|---|
| 9,405,718 B2 * | 8/2016 | Ranganathan | ........ G06F 13/387 |
| 2017/0272231 A1 * | 9/2017 | Chen | ........ H04L 25/14 |
| 2017/0286348 A1 | 10/2017 | Kambhatla | |
| 2018/0095925 A1 | 4/2018 | Iyer et al. | |

FOREIGN PATENT DOCUMENTS

WO    2018118304 A1    6/2018

OTHER PUBLICATIONS

EPO; Extended European Search Report issued in EP Patent Application No. 20207418.3, dated May 10, 2021; 8 pages.

(Continued)

*Primary Examiner* — Raymond N Phan

(74) *Attorney, Agent, or Firm* — Alliance IP, LLC

(57) ABSTRACT

An adapter is provided that includes a first interface to couple to a particular device, where link layer data is to be communicated over the first interface, and a second interface to couple to a physical layer (PHY) device. The PHY device includes wires to implement a physical layer of a link, and the link couples the adapter to another adapter via the PHY device. The second interface includes a data channel to communicate the link layer data over the physical layer, and a sideband channel to communicate sideband messages between the adapter and the other adapter over the physical layer. The adapter is to implement a logical PHY for the link.

20 Claims, 23 Drawing Sheets

(56) References Cited

OTHER PUBLICATIONS

PCI Express; PCI Express Base Specification Revision 3.0; retrieved from the Internet at http://komposter.com.ua/documents/PCI_Express_Base_Specification_Revision_3.0.pdf; Nov. 10, 2010; 36 pages.
Intel Corporation, "Logical PHY Interface (LPIF) Specification", (Mar. 23, 2019) 63 pages.
EPO Communication pursuant to Article 94(3) EPC in EP Application Serial No. 20207418.3-1224 dated May 15, 2023 (5 pages).

* cited by examiner

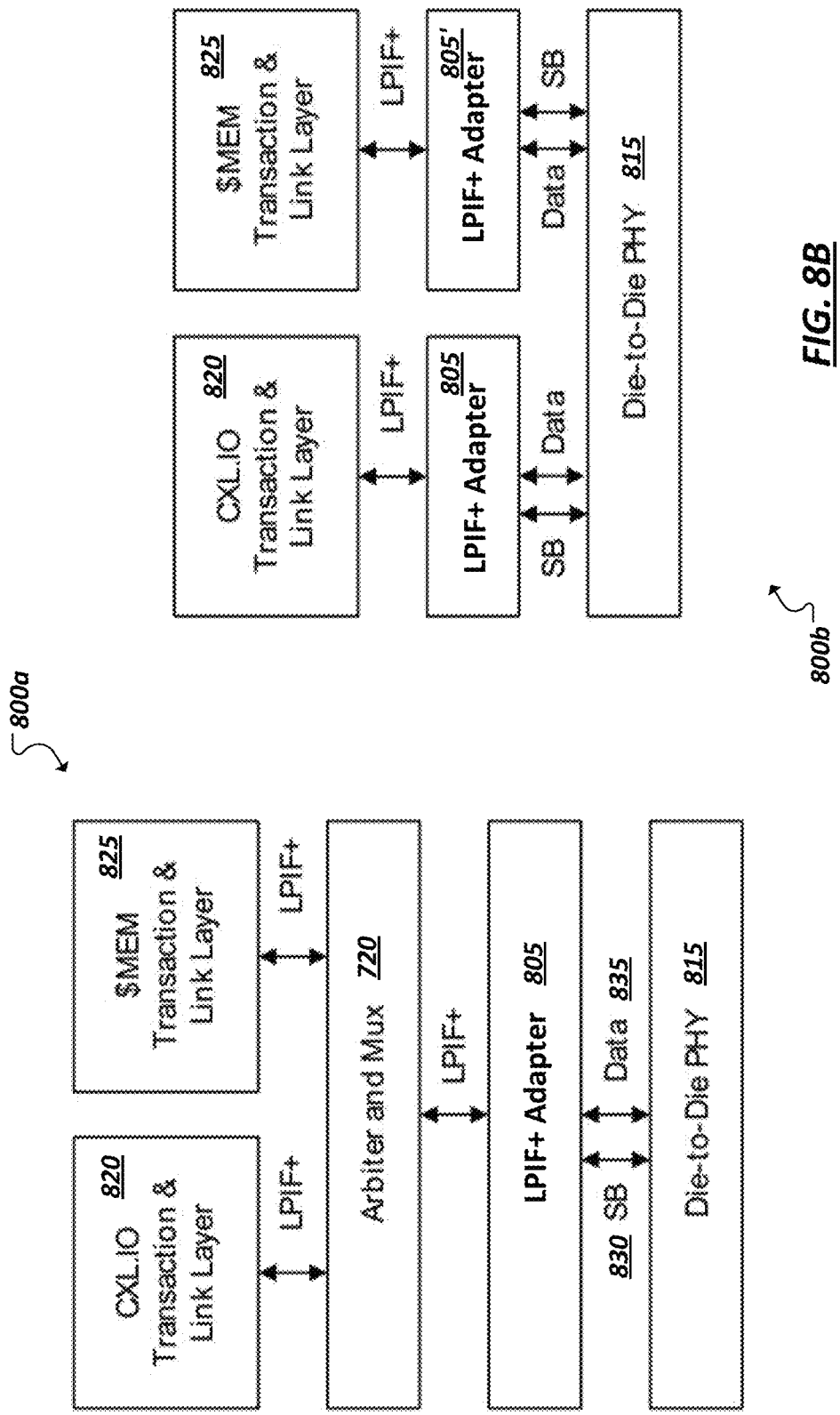

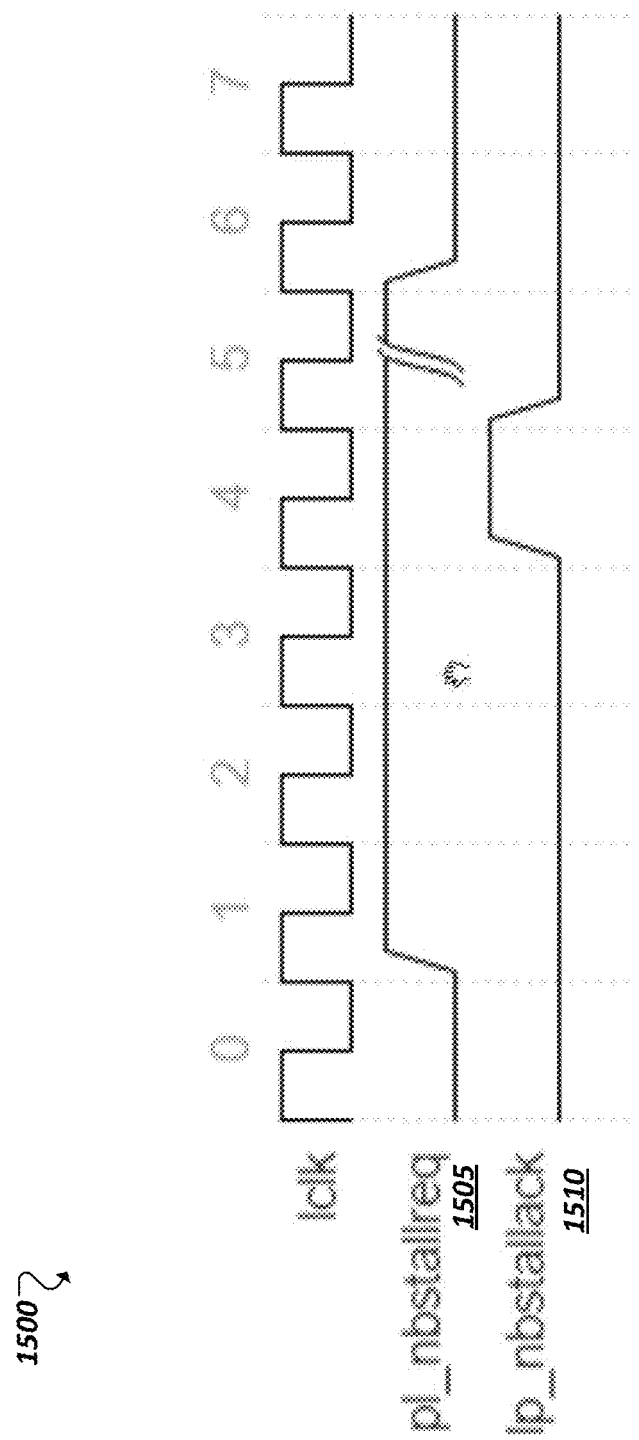

LINK LAYER-PHY INTERFACE ADAPTER

This application claims benefit to U.S. Provisional Patent Application Ser. No. 63/028,412, filed May 21, 2020 and incorporated by reference herein in its entirety.

FIELD

This disclosure pertains to computing systems, and in particular (but not exclusively) to computer interfaces.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc. As the processing power grows along with the number of devices in a computing system, the communication between sockets and other devices becomes more critical. Accordingly, interconnects, have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures. Interconnect architectures may be based on a variety of technologies, including Peripheral Component Interconnect Express (PCIe), Universal Serial Bus, and others.

BRIEF DESCRIPTION OF THE DRAWINGS

FIGS. 8A-8C are simplified block diagrams illustrating example implementations of interfaces utilizing example adapters.

FIG. 15 is a diagram illustrating signaling associated with a stall handshake

DETAILED DESCRIPTION

Figure 1:
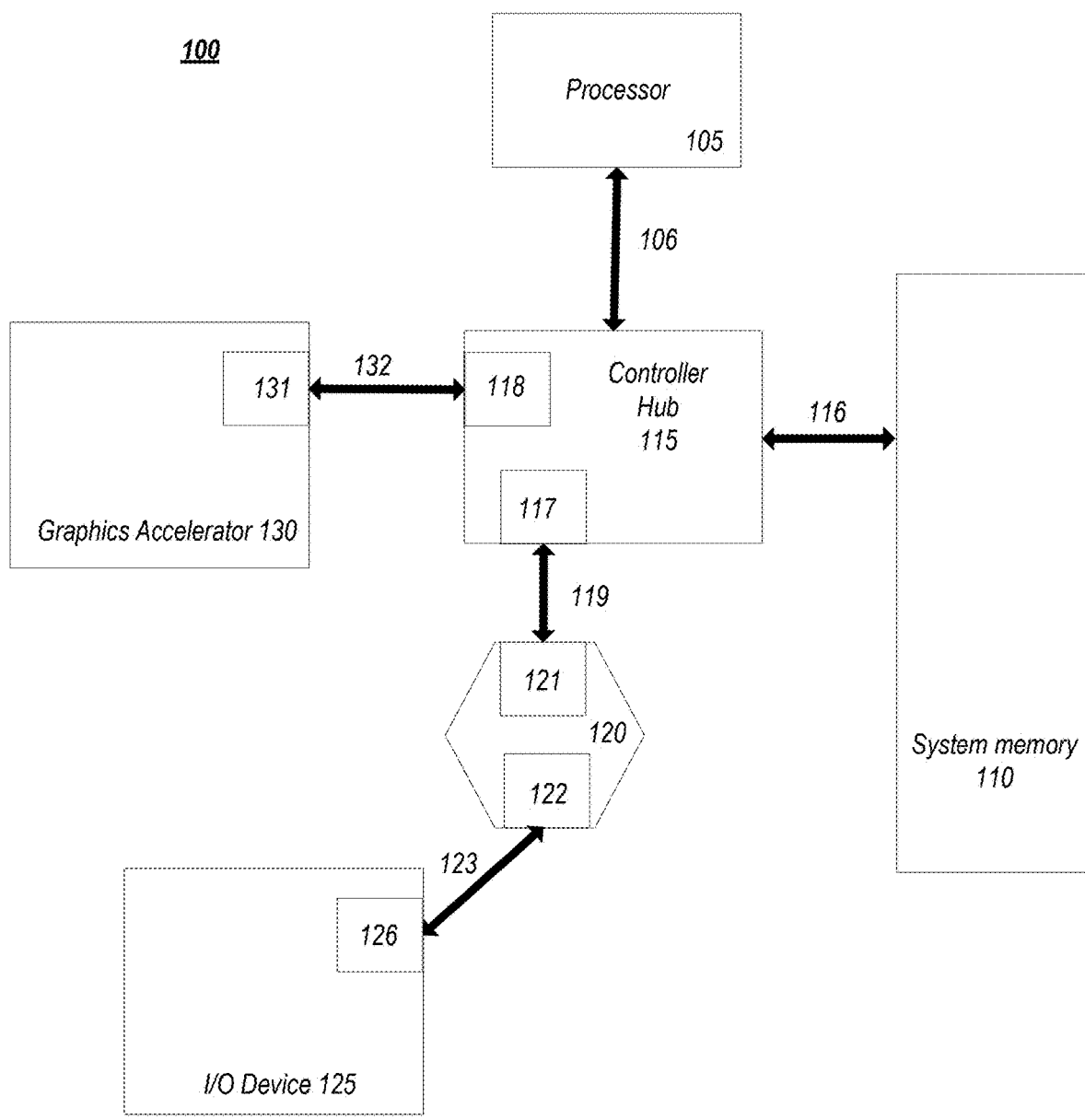
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the solutions described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. It should be appreciated that one or more of the components (e.g., 105, 110, 115, 120, 125, 130) illustrated in FIG. 1 can be enhanced to execute, store, and/or embody logic to implement one or more of the features described herein.

Figure 2:
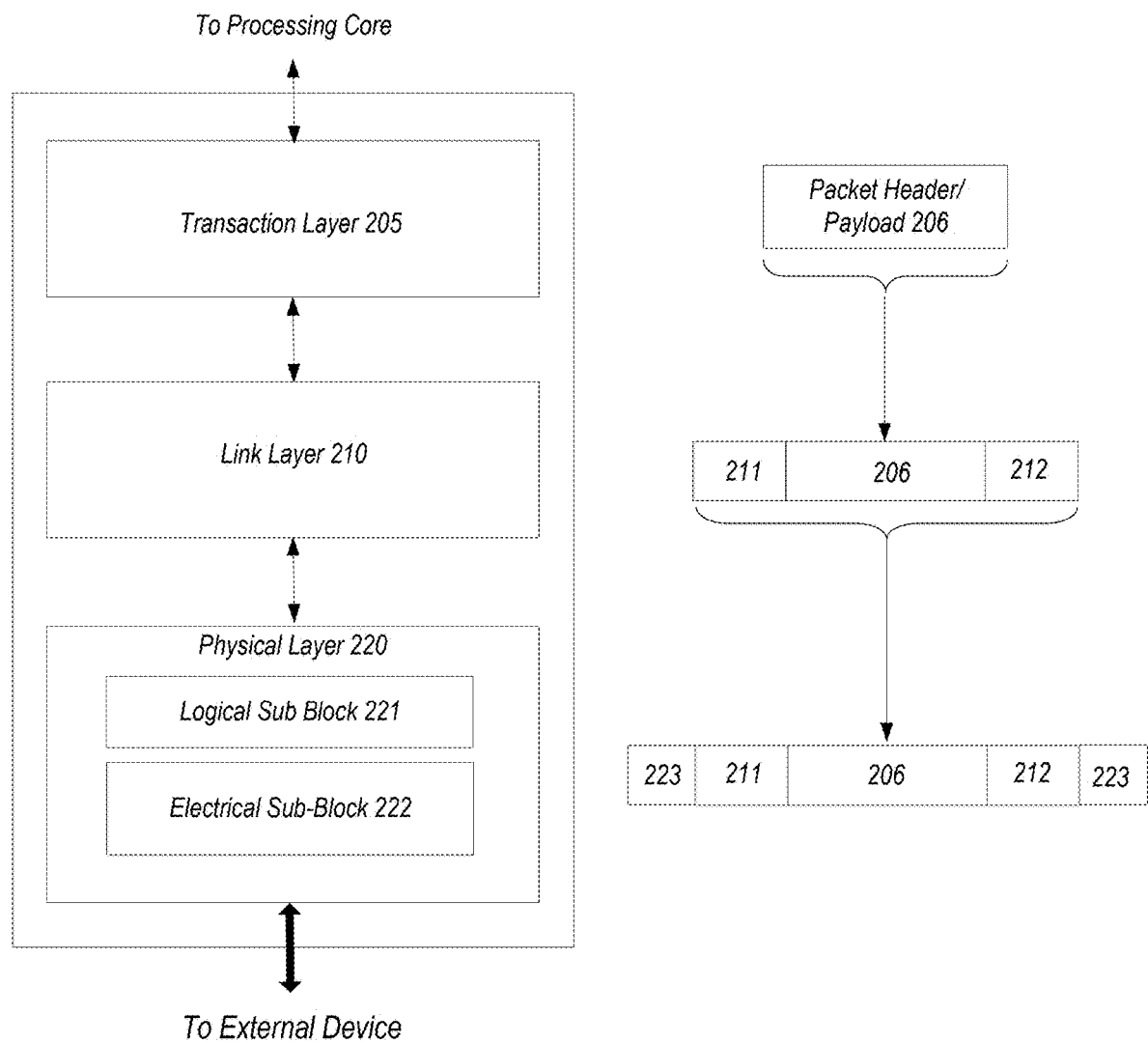
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-based flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message transactions are defined to support in-band communication between PCIe agents.

Therefore, in one embodiment, transaction layer 205 assembles packet header/payload 156. Format for current packet headers/payloads may be found in the PCIe specification at the PCIe specification website.

Figure 3:
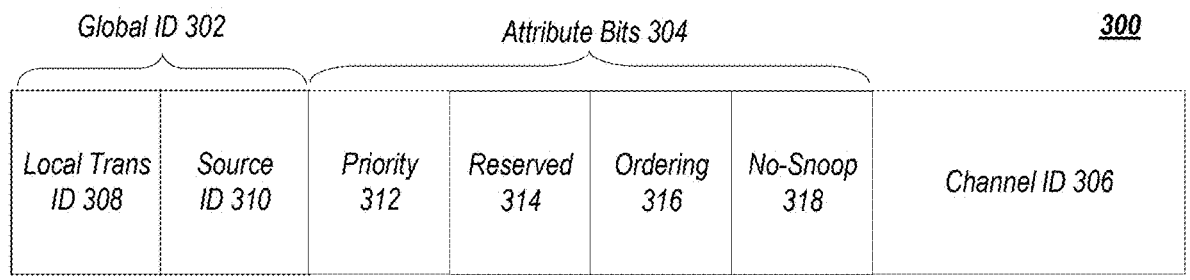
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
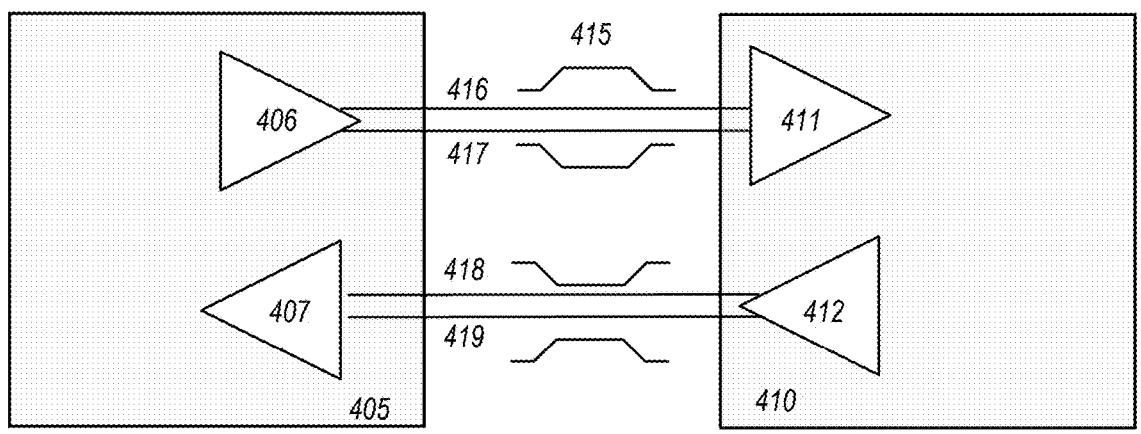
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/412 and a receive pair 411/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by ×N, where N is any supported Link width, such as 1, 2, 4, 8, 12, 16, 32, 64, or wider. In some implementations, each symmetric lane contains one transmit differential pair and one receive differential pair. Asymmetric lanes can contain unequal ratios of transmit and receive pairs. Some technologies can utilize symmetric lanes (e.g., PCIe), while others (e.g., Displayport) may not and may even including only transmit or only receive pairs, among other examples.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

A variety of interconnect architectures and protocols may utilize the concepts discussed herein. With advancements in computing systems and performance requirements, improvements to interconnect fabric and link implementations continue to be developed, including interconnects based on or utilizing elements of PCIe or other legacy interconnect platforms. In one example, Compute Express Link (CXL) has been developed, providing an improved, high-speed CPU-to-device and CPU-to-memory interconnect designed to accelerate next-generation data center performance, among other application. CXL maintains memory coherency between the CPU memory space and memory on attached devices, which allows resource sharing for higher performance, reduced software stack complexity, and lower overall system cost, among other example advantages. CXL enables communication between host processors (e.g., CPUs) and a set of workload accelerators (e.g., graphics processing units (GPUs), field programmable gate array (FPGA) devices, tensor and vector processor units, machine learning accelerators, purpose-built accelerator solutions, among other examples). Indeed, CXL is designed to provide a standard interface for high-speed communications, as accelerators are increasingly used to complement CPUs in support of emerging computing applications such as artificial intelligence, machine learning and other applications.

A CXL link may be a low-latency, high-bandwidth discrete or on-package link that supports dynamic protocol multiplexing of coherency, memory access, and input/output (I/O) protocols. Among other applications, a CXL link may enable an accelerator to access system memory as a caching agent and/or host system memory, among other examples. CXL is a dynamic multi-protocol technology designed to support a vast spectrum of accelerators. CXL provides a rich set of protocols that include I/O semantics similar to PCIe (CXL.io), caching protocol semantics (CXL.cache), and memory access semantics (CXL.mem) over a discrete or on-package link. Based on the particular accelerator usage model, all of the CXL protocols or only a subset of the protocols may be enabled. In some implementations, CXL may be built upon the well-established, widely adopted PCIe infrastructure (e.g., PCIe 5.0), leveraging the PCIe physical and electrical interface to provide advanced protocol in areas include I/O, memory protocol (e.g., allowing a host processor to share memory with an accelerator device), and coherency interface.

Figure 5:
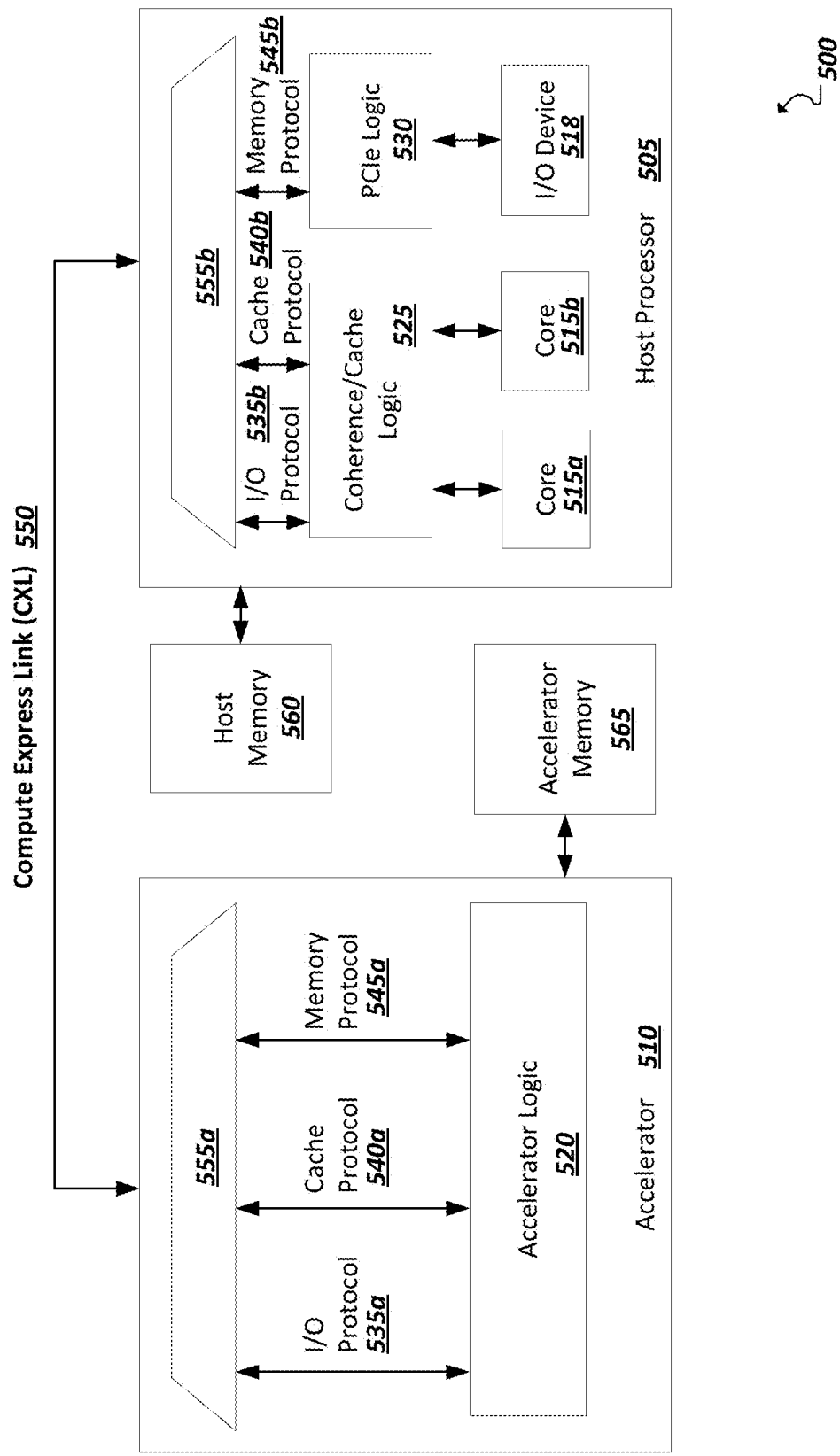
FIG. 5 illustrates an example implementation of a computing system including a host processor and an accelerator coupled by a link.

Turning to FIG. 5, a simplified block diagram 500 is shown illustrating an example system utilizing a CXL link 550. For instance, the link 550 may interconnect a host processor 505 (e.g., CPU) to an accelerator device 510. In this example, the host processor 505 includes one or more processor cores (e.g., 515a-b) and one or more I/O devices (e.g., 518). Host memory (e.g., 560) may be provided with the host processor (e.g., on the same package or die). The accelerator device 510 may include accelerator logic 520 and, in some implementations, may include its own memory (e.g., accelerator memory 565). In this example, the host processor 505 may include circuitry to implement coherence/cache logic 525 and interconnect logic (e.g., PCIe logic 530). CXL multiplexing logic (e.g., 555a-b) may also be provided to enable multiplexing of CXL protocols (e.g., I/O protocol 535a-b (e.g., CXL.io), caching protocol 540a-b (e.g., CXL.cache), and memory access protocol 545a-b (CXL.mem)), thereby enabling data of any one of the supported protocols (e.g., 535a-b, 540a-b, 545a-b) to be sent, in a multiplexed manner, over the link 550 between host processor 505 and accelerator device 510.

In some implementations, a Flex Bus port may be utilized in concert with CXL-compliant links to flexibly adapt a device to interconnect with a wide variety of other devices (e.g., other processor devices, accelerators, switches, memory devices, etc.). A Flex Bus port is a flexible high-speed port that is statically configured to support either a PCIe or CXL link (and potentially also links of other protocols and architectures). A Flex Bus port allows designs to choose between providing native PCIe protocol or CXL over a high-bandwidth, off-package link. Selection of the protocol applied at the port may happen during boot time via auto negotiation and be based on the device that is plugged into the slot. Flex Bus uses PCIe electricals, making it compatible with PCIe retimers, and adheres to standard PCIe form factors for an add-in card.

Figure 6:
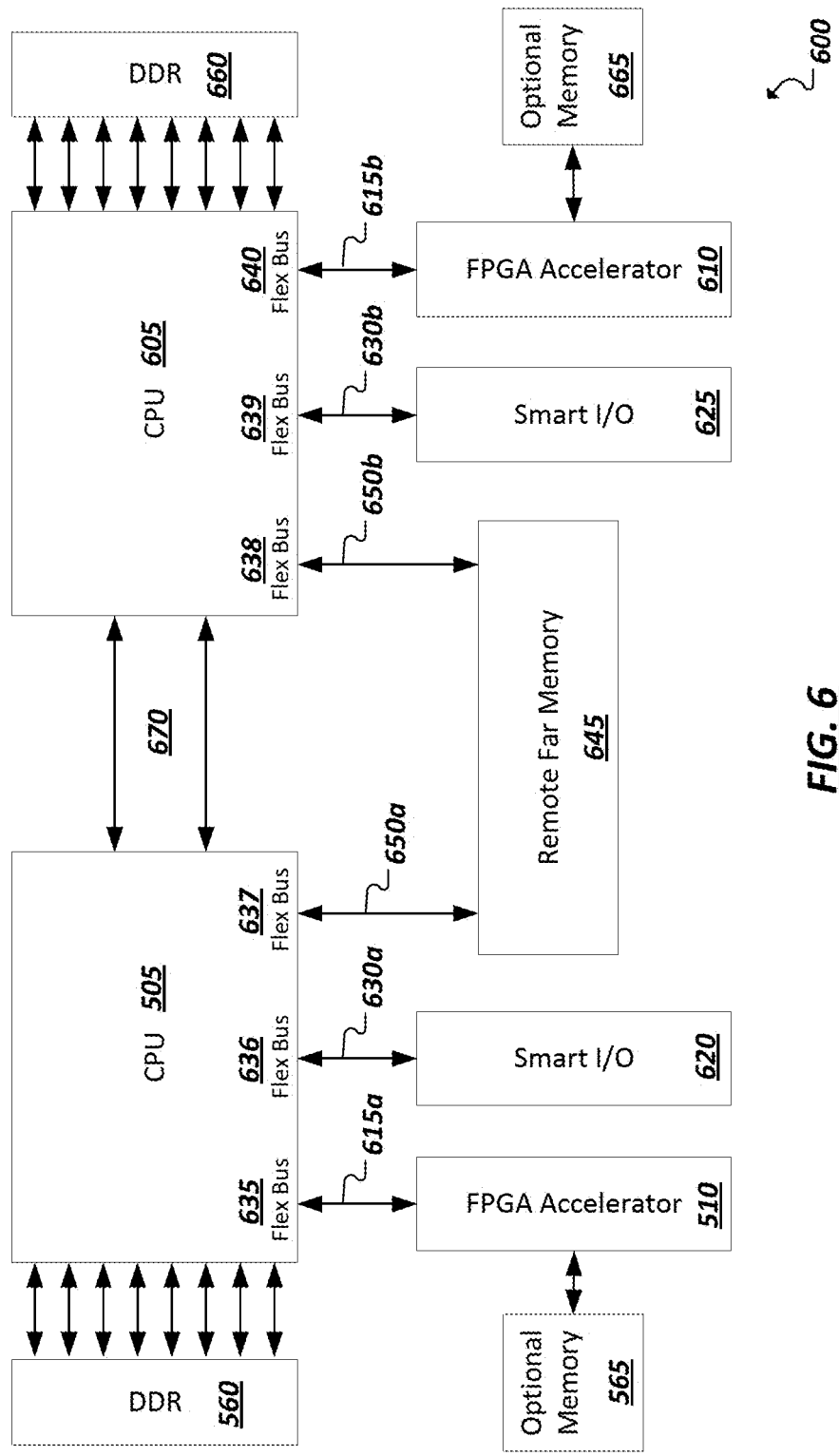
FIG. 6 illustrates an example implementation of a computing system including two or more interconnected processor devices.

Turning to FIG. 6, an example is shown (in simplified block diagram 600) of a system utilizing Flex Bus ports (e.g., 635-640) to implement CXL (e.g., 615a-b, 650a-b) and PCIe links (e.g., 630a-b) to couple a variety of devices (e.g., 510, 610, 620, 625, 645, etc.) to a host processor (e.g., CPU 505, 605). In this example, a system may include two CPU host processor devices (e.g., 505, 605) interconnected by an inter-processor link 670 (e.g., utilizing a UltraPath Interconnect (UPI), Infinity Fabric™, or other interconnect protocol). Each host processor device 505, 605 may be coupled to local system memory blocks 560, 660 (e.g., double data rate (DDR) memory devices), coupled to the respective host processor 505, 605 via a memory interface (e.g., memory bus or other interconnect).

As discussed above, CXL links (e.g., 615a, 650b) may be utilized to interconnect a variety of accelerator devices (e.g., 510, 610). Accordingly, corresponding ports (e.g., Flex Bus ports 635, 640) may be configured (e.g., CXL mode selected) to enable CXL links to be established and interconnect corresponding host processor devices (e.g., 505, 605) to accelerator devices (e.g., 510, 610). As shown in this example, Flex Bus ports (e.g., 636, 639), or other similarly configurable ports, may be configured to implement general purpose I/O links (e.g., PCIe links) 630a-b instead of CXL links, to interconnect the host processor (e.g., 505, 605) to I/O devices (e.g., smart I/O devices 620, 625, etc.). In some implementations, memory of the host processor 505 may be expanded, for instance, through the memory (e.g., 565, 665) of connected accelerator devices (e.g., 510, 610), or memory extender devices (e.g., 645, connected to the host processor(s) 505, 605 via corresponding CXL links (e.g., 650a-b) implemented on Flex Bus ports (637, 638), among other example implementations and architectures.

Figure 7:
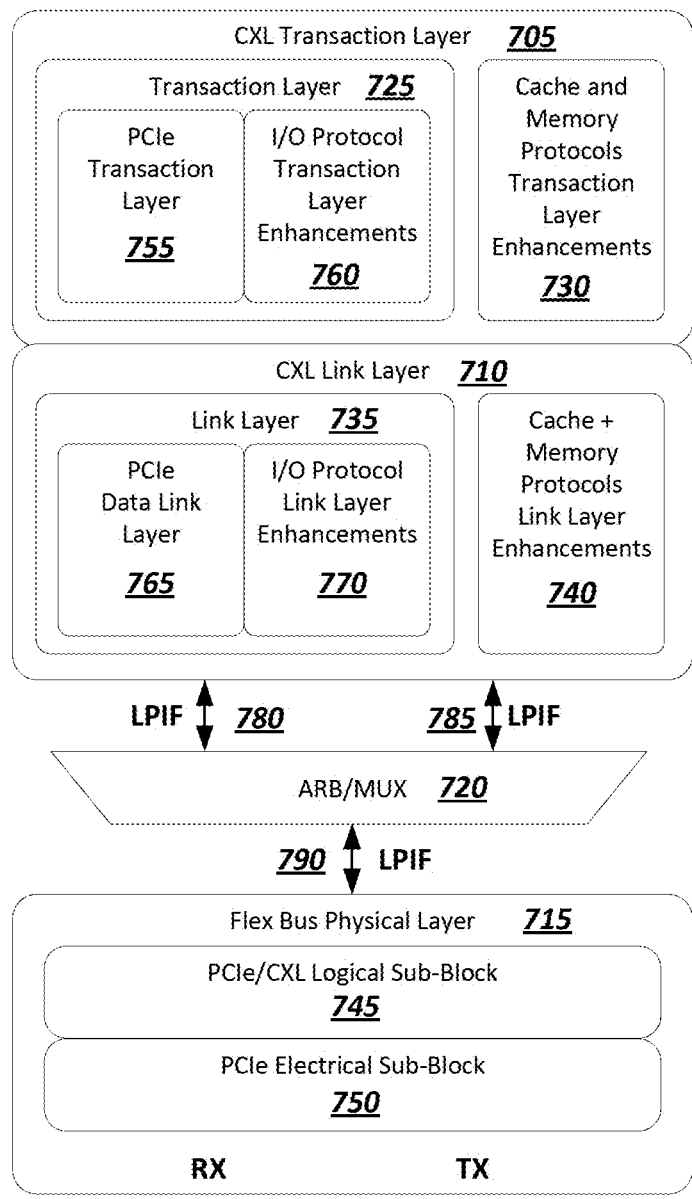
FIG. 7 illustrates a representation of an example port of a device including a layered stack.

FIG. 7 is a simplified block diagram illustrating an example port architecture 700 (e.g., Flex Bus) utilized to implement CXL links. For instance, Flex Bus architecture may be organized as multiple layers to implement the multiple protocols supported by the port. For instance, the port may include transaction layer logic (e.g., 705), link layer logic (e.g., 710), and physical layer logic (e.g., 715) (e.g., implemented all or in-part in circuitry). For instance, a transaction (or protocol) layer (e.g., 705) may be subdivided into transaction layer logic 725 that implements a PCIe transaction layer 755 and CXL transaction layer enhancements 760 (for CXL.io) of a base PCIe transaction layer 755, and logic 730 to implement cache (e.g., CXL.cache) and memory (e.g., CXL.mem) protocols for a CXL link. Similarly, link layer logic 735 may be provided to implement a base PCIe data link layer 765 and a CXL link layer (for CXl.io) representing an enhanced version of the PCIe data link layer 765. A CXL link layer 710 may also include cache and memory link layer enhancement logic 740 (e.g., for CXL.cache and CXL.mem).

Continuing with the example of FIG. 7, a CXL link layer logic 710 may interface with CXL arbitration/multiplexing (ARB/MUX) logic 720, which interleaves the traffic from the two logic streams (e.g., PCIe/CXL.io and CXL.cache/CXL.mem), among other example implementations. During link training, the transaction and link layers are configured to operate in either PCIe mode or CXL mode. In some instances, a host CPU may support implementation of either PCIe or CXL mode, while other devices, such as accelerators, may only support CXL mode, among other examples. In some implementations, the port (e.g., a Flex Bus port) may utilize a physical layer 715 based on a PCIe physical layer (e.g., PCIe electrical PHY 750). For instance, a Flex Bus physical layer may be implemented as a converged logical physical layer 745 that can operate in either PCIe mode or CXL mode based on results of alternate mode negotiation during the link training process. In some implementations, the physical layer may support multiple signaling rates (e.g., 8 GT/s, 16 GT/s, 32 GT/s, etc.) and multiple link widths (e.g., ×16, ×8, ×4, ×2, ×1, etc.). In PCIe mode, links implemented by the port 700 may be fully compliant with native PCIe features (e.g., as defined in the PCIe specification), while in CXL mode, the link supports all features defined for CXL. Accordingly, a Flex Bus port may provide a point-to-point interconnect that can transmit native PCIe protocol data or dynamic multi-protocol CXL data to provide I/O, coherency, and memory protocols, over PCIe electricals, among other examples.

The CXL I/O protocol, CXL.io, provides a non-coherent load/store interface for I/O devices. Transaction types, transaction packet formatting, credit-based flow control, virtual channel management, and transaction ordering rules in CXL.io may follow all or a portion of the PCIe definition. CXL cache coherency protocol, CXL.cache, defines the interactions between the device and host as a number of requests that each have at least one associated response message and sometimes a data transfer. The interface consists of three channels in each direction: Request, Response, and Data.

The CXL memory protocol, CXL.mem, is a transactional interface between the processor and memory and uses the physical and link layers of CXL when communicating across dies. CXL.mem can be used for multiple different memory attach options including when a memory controller is located in the host CPU, when the memory controller is within an accelerator device, or when the memory controller is moved to a memory buffer chip, among other examples. CXL.mem may be applied to transaction involving different memory types (e.g., volatile, persistent, etc.) and configurations (e.g., flat, hierarchical, etc.), among other example features. In some implementations, a coherency engine of the host processor may interface with memory using CXL.mem requests and responses. In this configuration, the CPU coherency engine is regarded as the CXL.mem Master and the Mem device is regarded as the CXL.mem Subordinate. The CXL.mem Master is the agent which is responsible for sourcing CXL.mem requests (e.g., reads, writes, etc.) and a CXL.mem Subordinate is the agent which is responsible for responding to CXL.mem requests (e.g., data, completions, etc.). When the Subordinate is an accelerator, CXL.mem protocol assumes the presence of a device coherency engine (DCOH). This agent is assumed to be responsible for implementing coherency related functions such as snooping of device caches based on CXL.mem commands and update of metadata fields. In implementations, where metadata is supported by device-attached memory, it can be used by the host to implement a coarse snoop filter for CPU sockets, among other example uses.

In some implementations, an interface may be provided to couple circuitry or other logic (e.g., an intellectual property (IP) block or other hardware element) implementing a link layer (e.g., 710) to circuitry or other logic (e.g., an IP block or other hardware element) implementing at least a portion of a physical layer (e.g., 715) of a protocol. For instance, an interface based on a Logical PHY Interface (LPIF) specification to define a common interface between a link layer controller, module, or other logic and a module implementing a logical physical layer ("logical PHY" or "log PHY") to facilitate interoperability, design and validation re-use between one or more link layers and a physical layer for an interface to a physical interconnect, such as in the example of FIG. 7. Additionally, as in the example of FIG. 7, an interface may be implemented with logic (e.g., 735, 740) to simultaneously implement and support multiple protocols. Further, in such implementations, an arbitration and multiplexer layer (e.g., 720) may be provided between the link layer (e.g., 710) and the physical layer (e.g., 715). In some implementations, each block (e.g., 715, 720, 735, 740) in the multiple protocol implementation may interface with the other block via an independent LPIF interface (e.g., 780, 785, 790). In cases where bifurcation is supported, each bifurcated port may likewise have its own independent LPIF interface, among other examples.

While examples discussed herein may reference the use of LPIF-based link layer-logical PHY interfaces, it should be appreciated that the details and principles discussed herein may be equally applied to non-LPIF interfaces. Likewise, while some examples may reference the use of common link layer-logical PHY interfaces to couple a PHY to controllers implement CXL or PCIe, other link layer protocols may also make use of such interfaces. Similarly, while some references may be made to Flex Bus physical layers, other physical layer logic may likewise be employed in some implementations and make use of common link layer-logical PHY interfaces, such as discussed herein, among other example variations that are within the scope of the present disclosure.

Advancements in multi-chip packaging (MCP) technologies is allowing multiple silicon dies to be included within the same package. High density, low latency die-to-die interconnects, optimized for short reach, are capable of very low bit error rates (BER) (e.g., better than 1e-18). As such, these interconnects typically omit the overhead of serializer/deserializer (SERDES) circuitry, as well as synchronization related to package trace transmission and also omit the overhead of a complicated link training and status state machine (LTSSM) in the logical PHY.

Various, different protocols (e.g., CXL, PCIe, UltraPath Interconnect (UPI), In-Die Interconnect (IDI), and others) would benefit from a generic logical PHY interface to enable use of die-to-die interconnect, with the generic logical PHY interface (or adapter) serving as a transport mechanism that abstracts handshakes for initialization, power management and link training. For instance, traditional logical PHY implementations may require custom handshakes with a traditional logical PHY for each different protocol. In improved implementations, adapter circuitry may be provided to implement a generic logical PHY that allows upper protocol layers (e.g., link layers) to be transported over a variety of different die-to-die fabric blocks. The adapter may enable a raw bit stream to be transported over a die-to-die interface that uses a subset of a common link layer-to-PHY interface protocol (e.g., LPIF). Potentially any die-to-die electrical interface may make use of such an interface through the provision of such adapters. In some implementations, the adapter may utilize a subset of a defined common link layer-to-PHY interface (such as LPIF) with which existing link layer controllers are already configured to interoperate with (e.g., LPIF for PCIe/Flexbus/R-Link log PHY, etc.), among other example uses and advantages.

Figure 8C:
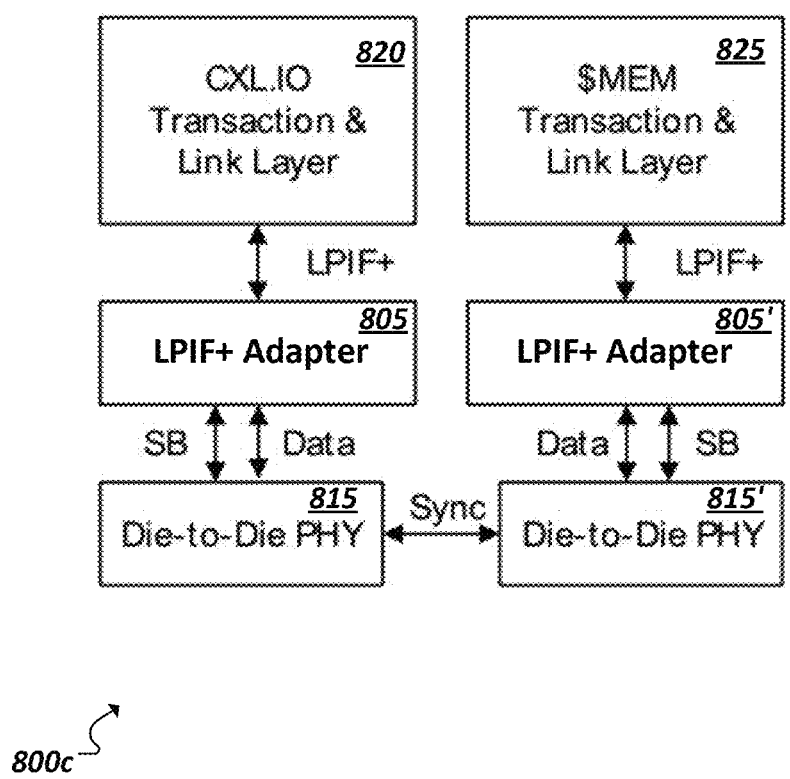

Turning to FIGS. 8A-8C, simplified block diagrams 800a-c are shown illustrating example implementations of interfaces utilizing adapter blocks (e.g., 805) to assist in implementing a common interface between various link layer blocks and various die-to-die PHY blocks. An example adapter (e.g., 805) may be provided to terminate, recondition, and gear data to be transmitted over the die-to-die interface 815. For instance, two or more dies may be provided on a package, with a die-to-die interconnect 815 (e.g., implemented as a high bandwidth die-to-die PHY IP block on the same package) serving as the interface between the two dies on the package. The adapter 805 may be provided with state machine logic to support and transition between a simplified set of states for a die-die environment. Additionally, the adapter may include logic to define an efficient sideband channel (e.g., 830) for various handshakes to be used to bring up the link, provide power management, and facilitate state transitions, among other example features. Such adapter devices may provide a generic and protocol-agnostic die-die interface that includes an in-band data channel (e.g., 835) and a sideband channel (e.g., 830). The adapter may be utilized to support a simplified logical PHY, which can result in lower latency and lower power for the interface, while enabling substantially more bandwidth per millimeter of die shoreline (or edge) due to dense I/O possible for a die-die interface. Additionally, the adapter may support simultaneous use by multiple protocols to allow such bandwidth to be scalable, among other example advantages.

As shown in FIGS. 8A-8C, various implementations may utilize an example adapter 805 (e.g., based on a common link layer-to-PHY interface (such as LPIF)) may be provided to implement a defined interface capable of transmitting and receiving data of the common link layer-to-PHY interface (e.g., LPIF data) over a die-to-die PHY 815. The link layer may have one or more functional pipes (e.g., 820, 825), with each pipe corresponding to an implemented protocol. In some implementations, such as illustrated in FIG. 8A, the traffic from each pipe 820, 825 may interface with a single, shared LPIF adapter 805. Further, in some implementations, such as in the example of FIG. 8A, an ARB/MUX 720 can be instantiated between a multi-protocol link layer (e.g., including link layer controllers 820, 825) and the adapter block 805, with the ARB/MUX 720 arbitrating between traffic from the different pipes (e.g., 820, 825) to drive to the adapter 805. The adapter may terminate and/or recondition the data of the common link layer-to-PHY interface for transfer over the die-to-die PHY (e.g., 815). The adapter 805 may also coordinate various handshakes with the link layer for power management (PM), and clock gating. The adapter 805 may also perform handshakes with the remote die when applicable for error/reset/power management propagation, among other example features. In short, use of an LPIF-based adapter 805, as in the example of FIGS. 8A-8C, allows link layer elements that already or natively support LPIF to seamlessly connect to a logical PHY for PCIe/CXL or to an LPIF adapter for die-to-die transport, with the LPIF adapter implementing a very light weight logical PHY for die-to-die communication.

The LPIF adapter 805 is to send a raw protocol stream over a multi-die interface for die-to-die operation. In some implementations, the die-to-die PHY 815 is implemented as a simplified high-density die-to-die PHY enabling lower latency and power performance than conventional die-to-die PHYs, among other examples. The LPIF adapter 805 may include digital logic used to interface with the PHY 815. The adapted 805 may implement a substantially simplified logical PHY for die-to-die transports. An LPIF adapter 805 may facilitate handshakes according to an LPIF interface while transferring raw data bits. The LPIF adapter 805 may implement a sideband channel 830 to the PHY 815 to exchange an adapter-to-adapter handshake. These handshakes could also be done via main band by assigning specific packets/flits unique to the LPIF adapter (and not used by the protocol), among other example implementations.

FIG. 8A shows an example implementation of an LPIF adapter 805 providing an interface between an ARB/MUX device 720 and a die-to-die PHY 815. The ARB/MUX circuitry 720 may include an LPIF interface to each one of multiple link layer functional pipes (provided through corresponding logic (e.g., 820, 825)). The ARB/MUX circuitry 720 may additionally include a single LPIF interface to couple to a single LPIF adapter (e.g., 805). In other implementations, ARB/MUX circuitry may be omitted, such as illustrated in the example of FIG. 8B. In the example of FIG. 8B, multiple link layer controllers (e.g., 820, 825) may be provided that, rather than being multiplexed to the same LPIF adapter, interface with a dedicated adapter instance (e.g., 805, 805'), which provides an interface and logical PHY between the link layer pipes and a die-to-die PHY 815. In the examples of FIGS. 8A-8B, there is a single cluster of the die-to-die PHY (e.g., an atomic unit, or cluster, of the die-to-die PHY such that all the signals within the cluster are synchronized natively).

Multiple LPIF adapters (e.g., 805, 805') may be provided, for instance, to facilitate higher bandwidth applications (e.g., to send parallel transmission of CXL.io and CXL.cache/ CXL.mem data). For instance, in FIG. 8C, bandwidth may be doubled (or otherwise multiplied) by providing multiple die-to-die PHY interfaces (e.g., 815, 815'). A respective adapter (e.g., 805, 805') may provide the corresponding logical PHY and interface between link layer controllers (e.g., 820, 825) and corresponding die-to-die PHY blocks (e.g., 815, 815'). In other instances, a single adapter may be provided as a logical PHY implementation and interface to multiple die-to-die PHY blocks (e.g., 815, 815'). In this example, the die-to-die PHY blocks (e.g., 815, 815') may be coupled (e.g., with a sideband or other channel (e.g., 830)) to enable additional synchronization between the die-to-die PHY blocks (e.g., 815, 815'), among other example features and implementations. Synchronization between different clusters of the die-to-die PHY (e.g., 815, 815') shows that the LPIF data width need not be tied to the die-to-die cluster width. Further, it should be appreciated that the examples illustrated in FIGS. 8A-8C are simplified examples and represent only a small fraction of the potential implementations, which may utilize adapters (such as described herein) providing interfaces to die-to-die PHYs.

Various signals and interactions may be defined between an adapter device and link layer element. Further, a sideband channel (e.g., 830) may be defined, in some implementations, to perform auxiliary communication with the remote die (e.g., a corresponding adapter on the remote die). In some instances, a unique flit/packet may be assigned for LPIF adapter communication with the remote die's LPIF adapter. Communication between the adapters (e.g., sideband handshakes or specialized packets) on the interconnected dies may be used, for instance, for link bring up and operation. The adapter may utilize a subset of signals defined in a link layer-to-PHY interface (e.g., LPIF) to implement the adapters lightweight logical PHY. Some signals may be omitted, for instance, in that, in some die-to-die applications, there may be no need for retraining (recovery) of the link once operational. Further, the scope of the adapter may be expanded to include it using the mechanisms that the corresponding link layer-to-PHY interface defines. Signaling between the adapter and the PHY block (e.g., die-to-die PHY) may be flexible and/or implementation specific, with the adapter configured to communicate according to the specific die-to-die PHY design.

In some implementations, an LPIF adapter and corresponding PHY blocks may scale with data width using single or multiple instantiations. In such cases, synchronization across multiple instantiations may be implemented in the PHY. Data transfer gear ratio can also be scaled based on PHY implementation. This may allow bridging die that operate on different frequencies, among other example applications. An example LPIF adapter can support serialization/deserialization, or simple throttling logic to make sure no data is lost when transferring over to a different frequency. In some implementations, an adapter may also implement, include, or otherwise instantiate clock crossing FIFO queues if required. Backpressure to the link layer may be controlled, for instance, using one of the signals defined in the corresponding link layer-to-PHY interface (e.g., pl_trdy in LPIF), among other examples. Further, error correction may be supported by adapters in some implementations, for instance, for additional link protection to ensure a particular BER requirement, among other examples. Error correction may be implemented in either (or both) the PHY block and the adapter, among other example features and implementations.

In some implementations, each instance of a link layer-to-PHY interface on a particular die may operate at the same clock frequency and within the same power domain. Additional FIFOs may be utilized for clock crossings if different clock frequencies or clock sources are used. If different power domains are used voltage isolation may be utilized, among other example features. Further, link layer logic and a corresponding adapter block may be within the same RESET domain. A secondary side adapter clock (e.g., PHY clock) may derived from the same phase-locked loop (PLL) circuit as primary side clock (LPIF clock). In some implementations, adapters may be configured such that some or all portions of the adapter are in an always-ON power domain to enable wake up from low power state (e.g., via sideband or mainband communication), among other example features.

Figure 9:
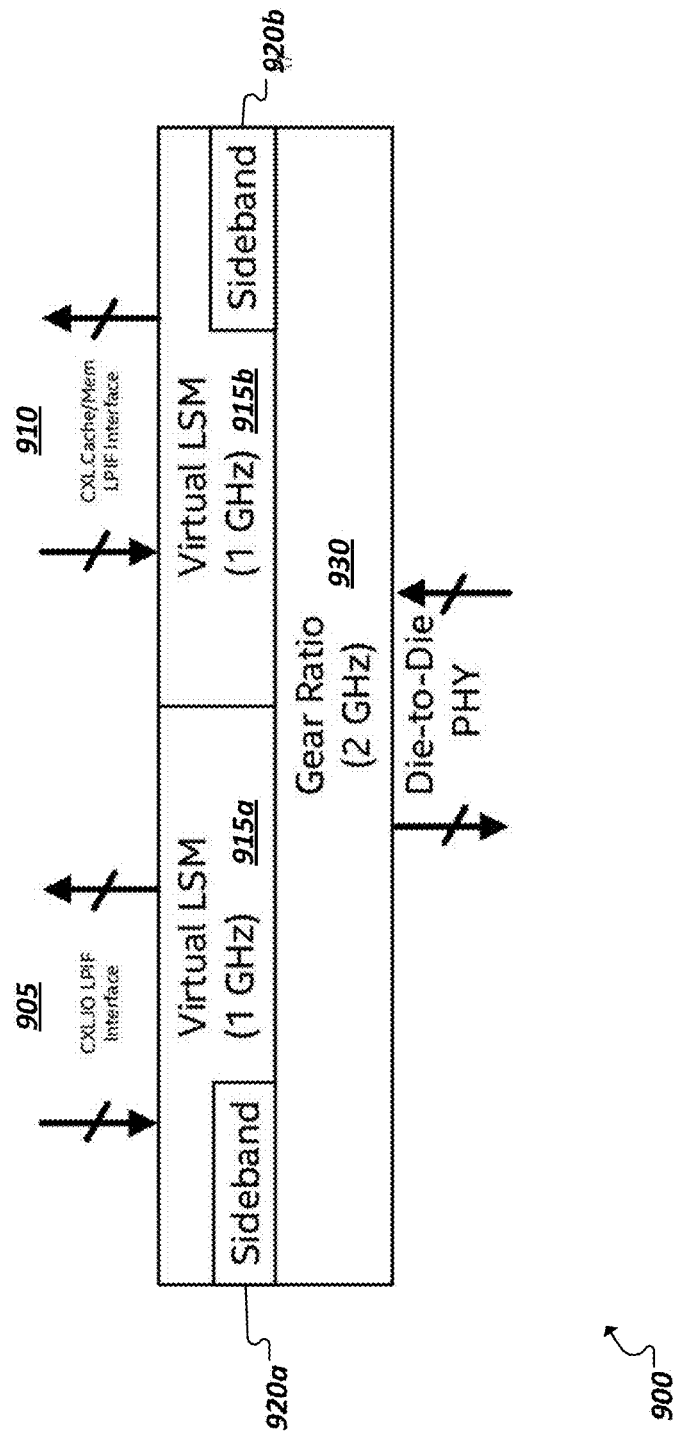
FIG. 9 is a simplified block diagram illustrating an example adapter.

Turning to FIG. 9, a simplified block diagram 900 is shown of an example adapter. The example of FIG. 9 shows an LPIF adapter with LPIF interfaces for facilitating two link layer pipes 905, 910 (e.g., one 905 for CXL.io and the other 910 for CXL.cache/mem). The respective link layer controllers may include logic for implementing the appropriate interface(s) (e.g., LPIF interfaces) to communicate with the adapter 805. Components of the adapter may be implemented in hardware circuitry, firmware, software, or a combination thereof. In one example implementation, the adapter may implement a virtual link state machine (LSM) 915*a,b* and corresponding logic. Virtual LSM logic 915*a,b* (e.g., implemented in hardware circuitry and/or firmware) may implement all the required handshakes and a valid/data interface to the ARB/MUX or link layer controllers. The handshake signals for various state transitions may be sent over a sideband encoding facilitated through corresponding sideband logic 920*a,b*. The sideband logic 920*a,b* may facilitate the handshakes according to a sideband interface provided by the PHY block 815. The adapter may additionally provide a gear ratio serializer circuitry 930. For instance, in the example of FIG. 9, a ×2 gear ratio serializer is shown as an example, with the gear ratio facilitating matching of the interface and PHY data rates. Indeed, the gearing ratio provided through the gear ratio serializer 930 is based on the PHY data rate. In some implementations, the PHY may contain additional SERDES logic to reduce pin count if running much faster than silicon data path, among other example implementations.

Figure 10:
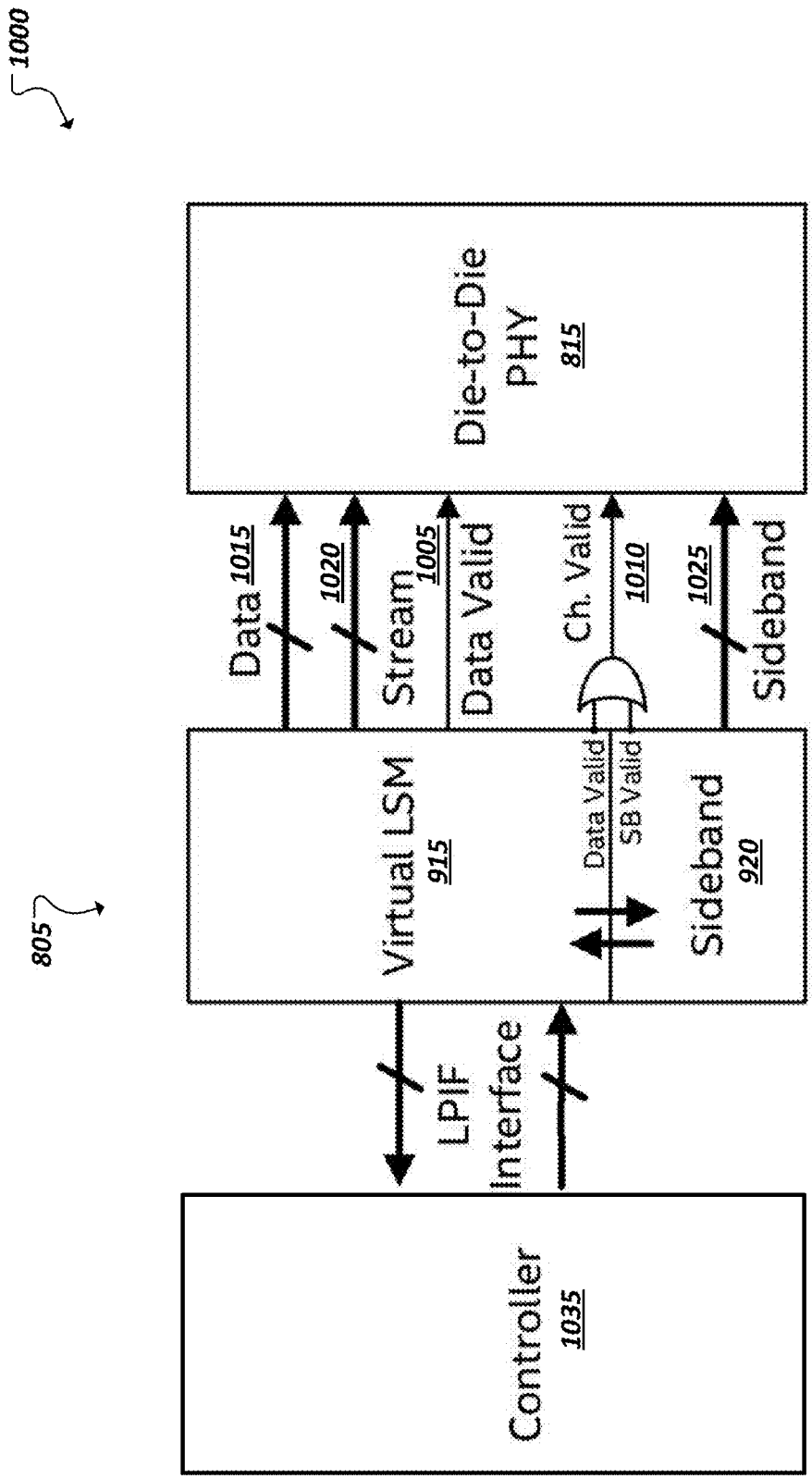
FIG. 10 is a simplified block diagram illustrating signaling from an example adapter to an example PHY.

FIG. 10 is a simplified block diagram 1000 showing a transmit data path of an example adapter 805 (to a PHY block 815 (e.g., a die-to-die PHY)). The data path may include transmit data lanes 1015 to transmit substantive, in-band data (e.g., originating from the link layer or other higher-level logic (e.g., implemented by controller 1035), as well as stream lanes 1020 to transmit a stream identifier to identify a protocol associated with the in-band data. In some implementations, the adapter may support and send two valid signals: a data valid 1005 and a channel valid 1010. The channel valid 1010 may be asserted when either in-band data (over 1015) or sideband (over transmit sideband lanes 1020) is sent over to the PHY 815. Data valid 1005 is sent to identify that data is sent over the data lanes 1015 (while the channel valid 1010 is also asserted).

Figure 11:
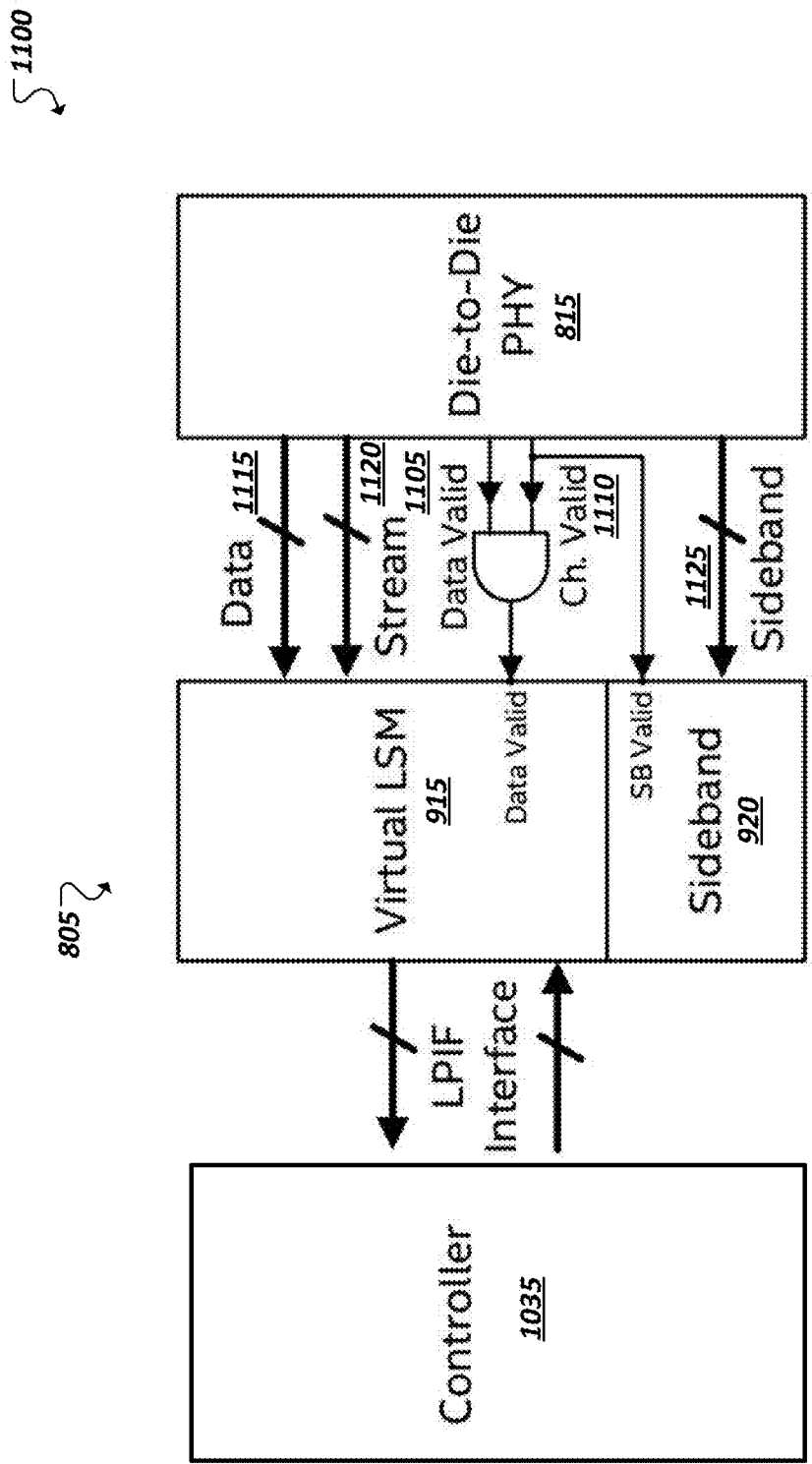
FIG. 11 is a simplified block diagram illustrating signaling from an example PHY to an example adapter.

FIG. 11 is a simplified block diagram 1100 showing a receiver data path of an example adapter (from the PHY block 815). Analogous to the functioning of the transmit data path, the adapter receive logic is configured to receive and decode asserted data valid 1105 and channel valid 1110 signals, and receive in-band data over receive data lanes 1115, stream identifier information corresponding to the in-band data sent over stream lanes 1120, and receive sideband data over receive sideband lanes 1125. In some implementations, the PHY block 815 may internally contain SERDES logic to upsample/downsample data before/after transfer respectively.

Figure 12:
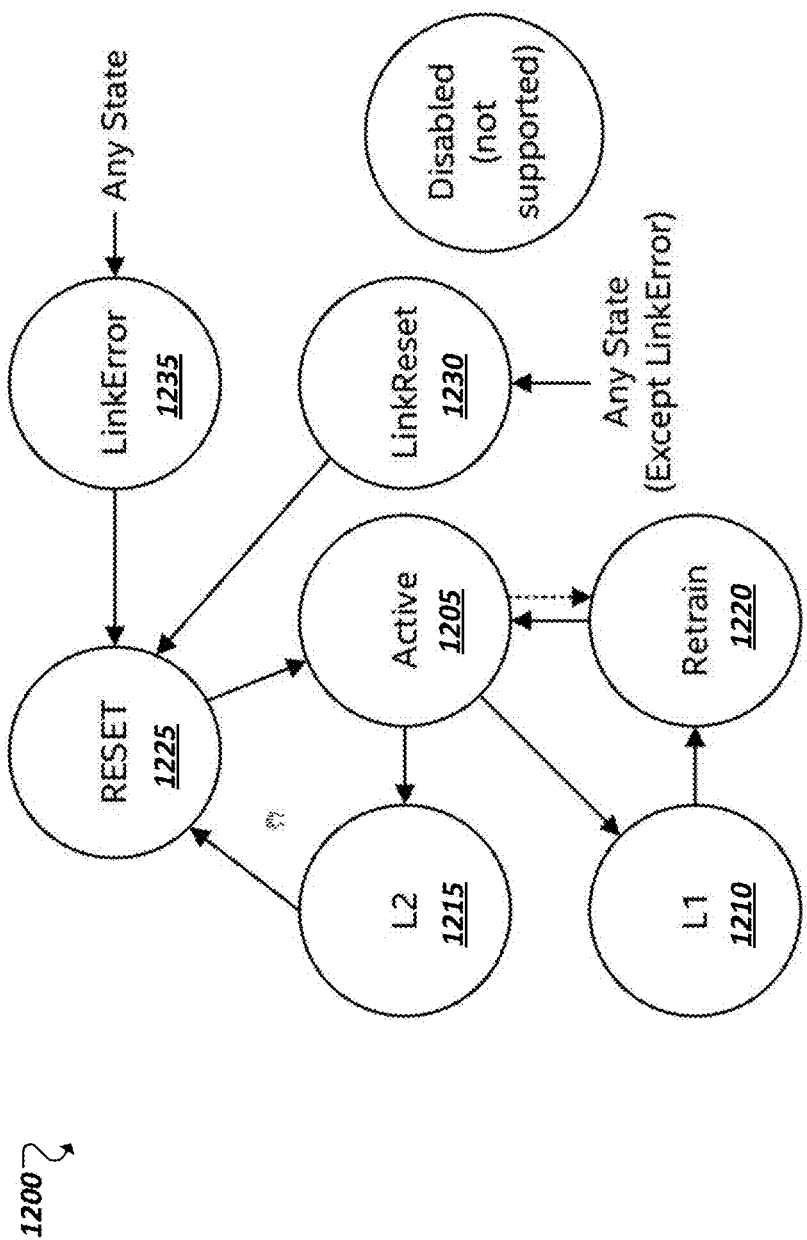
FIG. 12 is a diagram illustrating an example state machine of an example link layer-to-PHY interface standard.

FIG. 12 illustrates a diagram 1200 representing link states of an example link layer-to-PHY interface (e.g., LPIF) supported by a corresponding adapter device. The state machine shows permissible physical layer state status (pl state sts) transitions. In some instances, some of the states defined by the corresponding link layer-to-PHY interface may be omitted by the adapter implementation. States may include active link states (e.g., 1205), power management or low power link states (e.g., L1 (and associated sub-states) 1210, L2 (1215), etc.), among other example states. In some implementations, the adapter may implement a Retrain state (e.g., 1220) as a virtual state needed to satisfy LPIF handshake and not actually to retrain the PHY. In instances where Retrain is a PHY requirement, the adapter may be enhanced to propagate PHY retrain to link layer. Additional states may include Reset 1225 and LinkReset 1230 states, link error states (e.g., 1235), among other example states and implementations.

As noted above, in some implementations, an adapter device may support a sideband channel between the adapter and the PHY (e.g., over which sideband signals may be communicated between adapters on respective dies of a package) in addition to (and separate from the physical lanes implementing the data channel and other channels of the interface). In one example, the sideband channel may be implemented as an 8-lane sideband (or channel of a different width) to enable handshaking between the corresponding dies. The sideband may operate at the same data as the actual data bus, which may simplify clocking, among other example advantages. In some instances, in order to provide additional link protection on the sideband a simple SECDED scheme may be used, among other example implementations. In alternative implementations, communication between adapters on dies connected by a particular PHY block may instead be facilitated in-band, for instance, through a specialized flit or other implementation.

Table 1 below shows example signals for a sideband channel of an example adapter. In this table, "REQ" indicates a request to indicate a particular link state and STS indicates a status response, or acknowledgement, of entry into a particular link state. Additionally, in this example, a portion of the bits used in the sideband channel may be utilized as parity bits (e.g., bits d4-d7), for instance, to identify bit errors in sideband messages sent over the sideband channel, among other example features:

TABLE 1

Example Sideband Encoding

| Data | | | | Parity | | | | |
|---|---|---|---|---|---|---|---|---|
| Sideband Data | | | | | | | | |
| d0 | d1 | d2 | d3 | d4 | d5 | d6 | d7 | Encoding |
| 0 | 0 | 0 | 0 | 0 | 0 | 0 | 0 | Null |
| 1 | 0 | 0 | 0 | 1 | 1 | 0 | 1 | L1 REQ |
| 0 | 1 | 0 | 0 | 1 | 0 | 1 | 1 | L1 STS |
| 1 | 1 | 0 | 0 | 0 | 1 | 1 | 0 | ACTIVE REQ |
| 0 | 0 | 1 | 0 | 0 | 1 | 1 | 1 | ACTIVE STS |
| 1 | 0 | 1 | 0 | 1 | 0 | 1 | 0 | Link ERROR |
| 0 | 1 | 1 | 0 | 1 | 1 | 0 | 0 | L2 REQ |
| 1 | 1 | 1 | 0 | 0 | 0 | 0 | 1 | L2 STS |
| 0 | 0 | 0 | 1 | 1 | 1 | 1 | 0 | Link RESET REQ |
| 1 | 0 | 0 | 1 | 0 | 0 | 1 | 1 | Link RESET STS |
| 0 | 1 | 0 | 1 | 0 | 1 | 0 | 1 | Reserved |
| 1 | 1 | 0 | 1 | 1 | 0 | 0 | 0 | Reserved |
| 0 | 0 | 1 | 1 | 1 | 0 | 0 | 1 | Reserved |
| 1 | 0 | 1 | 1 | 0 | 1 | 0 | 0 | Reserved |
| 0 | 1 | 1 | 1 | 0 | 0 | 1 | 0 | Reserved |
| 1 | 1 | 1 | 1 | 1 | 1 | 1 | 1 | Reserved |

As introduced above, a link layer controller or ARB/MUX component that is to interface with an adapter positioned between the link layer and the PHY, can include logic to implement a common link layer-to-PHY interface to couple the controller or ARB/MUX to the adapter. Further, in the case of an ARB/MUX additional link layer-to-PHY interfaces may be provided to couple the ARB/MUX to each of the link layer protocol agents (or pipes) feeding into the ARB/MUX. Each of these link layer-to-PHY interfaces may be compliant with a defined protocol or standard for the interface. For instance, in the case of an LPIF-based implementations, each of the interface between the link layer controllers and ARB/MUX and/or adapter may LPIF interface instances. A number of signals, state machines, handshakes, and other protocol features may be implemented according to the link layer-to-PHY interface's specific definition (e.g., according to the LPIF specification, for LPIF interfaces). The adapter may likewise support these interfaces, but may utilize only a subset of the overall features and signals in interfacing with the physical PHY (e.g., a die-to-die PHY device).

As an example, Table 2 indicates example signals defined under LPIF and identifies to what extent (if any) each signal is or is not adopted by the adapter in its interface with the PHY. For instance, only a subset of the LPIF signals may be relevant for the die-to-die applications. For example, link subdivision semantics may not be applicable in general for a die-to-die interface, and so the assumption may be that there is only a single port. Accordingly, in the example illustrated by Table 2, for seamless interoperability with the link layer, the pl_link_cfg may always reflect a ×16 configuration. An LPIF adapter behavior describes the function of the adapter on specific baseline LPIF signals in the context of a die-to-die interface. Signals may be tied off, passed through, configured to a fixed setting, or used for interface handshake, among other example uses. In one example, all signals are synchronous with LPIF clock (lclk) unless explicitly mentioned to be asynchronous in the LPIF specification. Further, in the example of Table 2, "pl_*" indicates that the signal is driven away from physical layer to link layer, while "lp_*" indicates that the signal is driven away from link layer to physical layer:

TABLE 2

Example LPIF-Based Adapter Signal Interface

| Signal Name | Per Port or Lane | LPIF Adapter Behavior |
|---|---|---|
| lclk | Per Port | Link Clock: The clock frequency the LPIF interface operates at. The Link Clock is an input to signal to both the Link Layer as well as the Logical PHY.<br>The IP subsystem is responsible for providing the Link Clock. |
| pl_trdy | Per Port | Physical Layer is ready to accept data, data is accepted by Physical layer when pl_trdy, lp_valid, and lp_irdy are asserted. Adapter can use this to backpressure link layer when transferring data to a lower frequency die etc., as well. |
| pl_data[NBYTES-1:0][7:0] | Shared | Physical Layer to Link Layer Data, where 'NBYTES' equals number of bytes determined by the supported data bus for the LPIF interface. |
| pl_valid | Shared | Physical Layer to Link Layer indicates data valid on pl_data. 'PL_NVLD' equals the number of valid bits. The bytes of pl_data associated with a specific bit of pl_valid is implementation specific. Single bit of pl_valid should suffice, since there is only a single port. |
| pl_stream[7:0] | Per Port | Physical Layer to Link Layer indicating the stream ID associated with the received data.<br>The Logical PHY forwards the stream ID received from the remote agent. |
| pl_error | Per Port | Tie off to 0. This follows from the assumption that there is no concept of link recovery/retrain, and so the only link level errors are fatal (uncorrectable internal errors). If an implementation chooses to support link recovery/retrain, then this signal should be driven as per LPIF specification definition. |
| pl_trainerror | Per Port | Indicates that physical layer training failed.<br>This signal shall be asserted by the Logical PHY when training related errors are detected. Used to indicate fatal error to link layer. |
| pl_cerror | Per Port | Tie off to 0 |
| pl_stallreq | Per Port | Physical Layer request to Link Layer to flush all packets for state transition |
| pl_tmstmp | Per Port | Tie off to 0. This follows from an assumption that for the die-to-die interfaces the delays should have very little jitter and so the PTM logic can use a pre-determined value for the delays through the adapter and PHY. |
| pl_tmstmp_stream[7:0] | Per Port | Tie off to 0. This follows from an assumption that for the die-to-die interfaces the delays should have very little jitter and so the PTM logic can use a pre-determined value for the delays through the adapter and PHY |
| pl_phyinl1 | Per Port | Physical Layer to Link Layer indication that the Physical Layer is in L1 state. Please note that pl_state_sts indicates the status of the interface whereas this signal is asserted after the physical layer completes entry into L1 state. |
| pl_phyinl2 | Per Port | Physical Layer to Link Layer indication that the Physical Layer is in L2 state. Please note that pl_state_sts indicates the status of the interface whereas this signal is asserted after the physical layer completes entry into L2 state. |
| lp_irdy | Per Port | Link Layer to Physical Layer indicating Link Layer is ready to transfer data. lp_irdy must not be presented by the upper layers when pl_state_sts is RESET. |
| lp_pri[1:0] | Per Port | Tie off to 0 |
| lp_data[NBYTES-1:0][7:0] | Shared | Link Layer to Physical Layer Data, where 'NBYTES' equals number of bytes determined by the data width for the LPIF instance. |
| lp_stream[7:0] | Per Port | Link Layer to Physical Layer indicates the stream ID to use with data.<br>Refer to the StreamID Rules section for details |
| lp_valid | Shared | Link Layer to Physical Layer indicates data valid on the corresponding lp_data bytes. When lp_irdy is asserted, at least one of the bits of lp_valid must be asserted. Single bit should suffice, since there is only one port. |
| lp_stallack | Per Port | Link Layer to Physical layer indicates that the packets are aligned LPIF width boundary (if pl_stallreq was asserted) |
| lp_state_req[3:0] | Per Port | Link Layer Request to Logical Physical Layer to request state change.<br>Encodings as follows:<br>0000: NOP<br>0001: Active<br>0010: Active.L0s<br>0011: Deepest Allowable PM State [L1 Substates only]<br>0100: L1.1<br>0101: L1.2<br>0110: L1.3 |

TABLE 2-continued

Example LPIF-Based Adapter Signal Interface

| Signal Name | Per Port or Lane | LPIF Adapter Behavior |
|---|---|---|
| | | 0111: L1.4 |
| | | 1000: L2 |
| | | 1001: LinkReset |
| | | 1010: Reserved |
| | | 1011: Retrain |
| | | 1100: Disable |
| | | All other encodings are reserved. |
| pl_state_sts[3:0] | Per Port | Physical Layer to Link Layer Status indication of the Interface. Encodings as follows: |
| | | 0000: Reset |
| | | 0001: Active |
| | | 0010: Active.L0s |
| | | 0011: Reserved |
| | | 0100: L1.1 |
| | | 0101: L1.2 |
| | | 0110: L1.3 |
| | | 0111: L1.4 |
| | | 1000: L2 |
| | | 1001: LinkReset |
| | | 1010: LinkError |
| | | 1011: Retrain |
| | | 1100: Disable |
| | | All other encodings are reserved. |
| lp_tmstmp | Per Port | Tie off to 0. This follows from an assumption that for the die-to-die interfaces the delays should have very little jitter and so the PTM logic can use a pre-determined value for the delays through the adapter and PHY. |
| lp_linkerror | Per Port | Link Layer to Physical Layer indication that a fatal error has occurred, and Physical Layer must move to LinkError State when it samples this signal. |
| pl_quiesce | Per Port | Tie off to 0 |
| lp_flushed_all | Per Port | Tie off to 0 |
| lp_rcvd_crc_err | Per Port | Tie off to 0. This follows from the assumption that there is no requirement of link recovery/retrain for die-to-die transport. |
| pl_lnk_cfg[2:0] | Per Port | Tie off to code: x16 |
| pl_lnk_up | Per Port | Indication from logPHY indicating Link Up state (e.g., as specified in the corresponding link specification) |
| pl_rxframe_errmask | Per Port | Tie off to 0 |
| pl_portmode[P-1:0] | n/a | Tie off to code: x16 |
| pl_portmode_val | n/a | Tied to 1 |
| pl_speedmode[2:0] | Per Port | Tie off to code associated with highest supported speed of the link layer |
| pl_clr_lnkreq[2:0] | Per Port | Tie off to 0 |
| pl_set_lnkreq[2:0] | Per Port | Tie off to 0 |
| pl_inband_pres | Per Port | Tied to 1 |
| lp_device_present | Per Port | Tie off to 0, based on assumption that not used for die-to-die transport |
| pl_ptm_rx_delay[7:0] | Per Port | Tie off to 0 |
| pl_setlabs | Per Port | Tie off to 0 |
| pl_setlbms | Per Port | Tie off to 0 |
| pl_surprise_lnk_down | Per Port | Tie off to 0: error escalation through training error |
| pl_protocol[2:0] | Per Port | Tie off to code associated with a particular protocol (e.g., CXL) |
| pl_protocol_vld | Per Port | Tied to 1 |
| pl_err_pipestg | Per Lane | Tie off to 0 |
| lp_wake_req | Per Port | Request from the Link Layer to remove clock gating from the internal logic of the logPHY. This is an asynchronous signal [not tied to lclk being available] |
| pl_wake_ack | Per Port | Acknowledge from the logPHY that it has un-gated clocks in response to lp_wake_req. Only asserted when lp_wake_req is asserted, and de-asserted after lp_wake_req has de-asserted. This is synchronous with lclk. |
| pl_clk_req | Per Port | Request from the logPHY to remove clock gating from the internal logic of the Link Layer. This is an asynchronous signal [not tied to lclk being available]. |
| lp_clk_ack | Per Port | Acknowledge from the Link Layer that it has un-gated clocks in response to pl_clk_req. Only asserted when pl_clk_req is asserted, and de-asserted after pl_clk_req has de-asserted. This is synchronous with lclk. |
| pl_phyinrecenter | Per Port | Handled through STATE_STS = Retrain |
| pl_exit_cg_req | Per Port | When asserted, requests Upper level protocol stacks to exit clock gated state ASAP. |

TABLE 2-continued

Example LPIF-Based Adapter Signal Interface

| Signal Name | Per Port or Lane | LPIF Adapter Behavior |
|---|---|---|
| pl_exit_cg_ack | Per Port | When asserted, indicates that Upper level protocol stacks are not in clock gated state and are ready to receive packets from the Physical Layer. |
| pl_cfg[NC-1:0] | | Optional. The assumption being that any configuration registers that need to be accessed in the LPIF adapter have a SOC specific access mechanism. If that is not present, the LPIF configuration (cfg) bus can be used for that purpose. |
| pl_cfg_vld | | Optional |
| lp_cfg[NC-1:0] | | Optional |
| lp_cfg_yld | | Optional |

In some example, an LPIF clock (lclk) and PHY clock (e.g., equal to 2×lclk in one example) are utilized within a corresponding, example LPIF adapter. Sideband may operate at the same data rate as Data. Both lclk and PHY clock may be generated from the same PLL. This avoids clock crossing FIFOs and reduces latency, among other example advantages.

Figure 13:
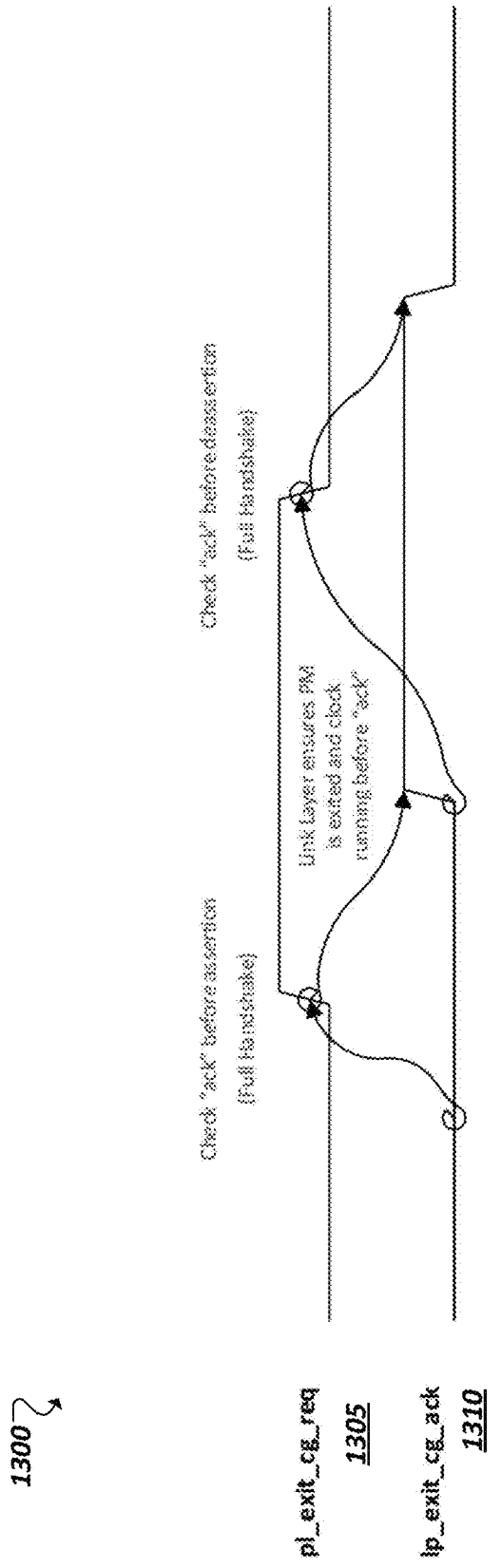
FIG. 13 is a diagram illustrating signaling associated with a clock gating handshake.

In some implementations, including LPIF-based implementations, power management at an example adapter may be at least partially facilitated through clock gating. For instance, in an LPIF-based implementations, an Exit Clock Gating Req/Ack mechanism may be provided, which is facilitated through a full handshake, as described by the rules below (and illustrated by the example timing diagram 1300 of FIG. 13):

1) Ungating of clocks may be requested (e.g., by the adapter) by asserting the pl_exit_cg_req signal (1305) to request ungating of clocks by the entity on the other end of the interface. A rising edge on pl_exit_cg_req is to only occur when lp_exit_cg_ack (1310) is de-asserted.

2) The other component asserts the lp_exit_cg_ack to indicate that it is not in clock gated state and are ready to receive packets from the physical layer, which may be sent on the Rx path once the lp_exit_cg_ack is sampled.

3) The pl_exit_cg_req signal and lp_exit_cg_ack signal are to be sampled as asserted before entering the active state.

4) The pl_exit_cg_req signal is to de-assert before lp_exit_cg_ack signal.

5) When exiting reset or low power state (e.g., L1, L2, Reset, or Disable), pl_exit_cg_req signal once asserted is to stay asserted until the state machine transitions to a state other than a low power state (e.g., L1, L2 or Disable).

Clock gating is to be removed before the first entry into Active state, every entry into LinkError and on every entry into Active state from other states where clock gating is permitted. Power management clock gating may be utilized, for instance, in low power states, such as the L1, DAPM, L2 states. In some implementations, the adapter and/or PHY are allowed to initiate exit_cg_req/ack handshake at any time and the corresponding Link Layer controllers are to respond. For instance, this handshake may be initiated and used during initial boot to ensure Link Layer is ready to receive packets, for PM exit, or any other conditions deemed necessary by the physical layer. It is also permitted in certain protocols to omit this handshake for transitioning between two states that do not implement clock gating (e.g., Retrain->Active transition). In some implementations, during initialization, the adapter may this handshake to ensure that the Upper Layers exit Clock gating and are ready to receive packets before first entry into the Active State.

In some implementations, when Upper Layer logic is initiating PM exit then it must ensure its PM and Clock Gating are removed first. A request to exit from L1 may be initiated by the Upper Layer by changing the current lp_state_req encoding to a new requested state (other than the currently requested state), the change in the lp_state_req can be used by the adapter to exit Trunk and local clock gating. In this case, individual bits of lp_state_req signal must be guaranteed to be glitch free to avoid multiple clock ungating requests. Upper Layer can request removal of trunk and local clock gating by asserting lp_wake_req (asynchronous to lclk availability). The adapter may respond with a pl_wake_ack (synchronous to lclk). The extent of internal clock ungating when pl_wake_ack is asserted may be implementation specific, but lclk should be available by this time to enable LPIF interface transitions from the Upper Layers.

In some implementations, a Wake Req/Ack handshake may be defined in LPIF implemented, such as:

1) Upper Layer asserts lp_wake_req to request ungating of clocks by the adapter. This can be done in parallel to lp_state_req change.

2) The adapter may assert pl_wake_ack to indicate that clock gating has been removed. At least one clock cycle bubble may be enforced between lp_wake_req assertion and pl_wake_ack assertion.

3) lp_wake_req is to de-assert before pl_wake_ack de-asserts. In some implementations, it is the responsibility of the Upper Layer to control the specific scenario of deassertion. As an example, when performing the handshake for a state request, a link layer controler can keep lp_wake_req asserted until it observes the desired state status.

4) lp_wake_req may not be the only consideration to perform clock gating, for instance, pl_state_sts and other protocol specific requirements may be taken into account before performing trunk and/or local clock gating.

In some cases, when the adapter are initiating an exit from a power management state it ensures that Upper Layer Clock Gating is removed. The corresponding handshake to initiate exit from power management may utilize the exit clock Req/Ack mechanism by asserting the pl_exit_cg_req signal. The pl_exit_cg_req signal may be guaranteed to be glitch free to avoid multiple clock ungating requests. In some cases, the adapter may initiate entry into a LinkError state (e.g., based on error detection logic on the adapter and/or PHY) and, in concert, ensure that Upper Layer Clock gating is removed so that the hardware failure is notified to the Upper Layer.

In some implementations, LPIF provides an optional mechanism in the form of pl_clk_req and lp_clk_ack handshake to allow the adapter to request removal of clock gating from Upper Layers. This mechanism may be especially useful in situations where multiple protocol layers mux over a single adapter instance, but certain link functionality (e.g., interrupt generation for link events) is handled by only one of the protocols. In this case, the adapter may use the pl_clk_req and lp_clk_ack handshake to make sure the corresponding protocol layer has its particular clock gating removed (e.g., regardless of LPIF state). For instance:

1) The adapter may assert pl_clk_req to request removal of clock gating by the Link Layer. This can be done asynchronously, and independent of current LPIF state.

2) The Link Layer asserts lp_clk_ack to indicate that clock gating has been removed. At least one clock cycle bubble may be enforced between pl_clk_req assertion and lp_clk_ack assertion.

3) pl_clk_req is de-asserted before lp_clk_ack. It is the responsibility of the Logical PHY to control the specific scenario of de-assertion, once the required actions for this handshake are completed.

4) pl_clk_req should not be the only consideration for Link Layer to perform clock gating, it may also take into account pl_state_sts and other protocol specific requirements before performing trunk and/or local clock gating.

Figure 14:
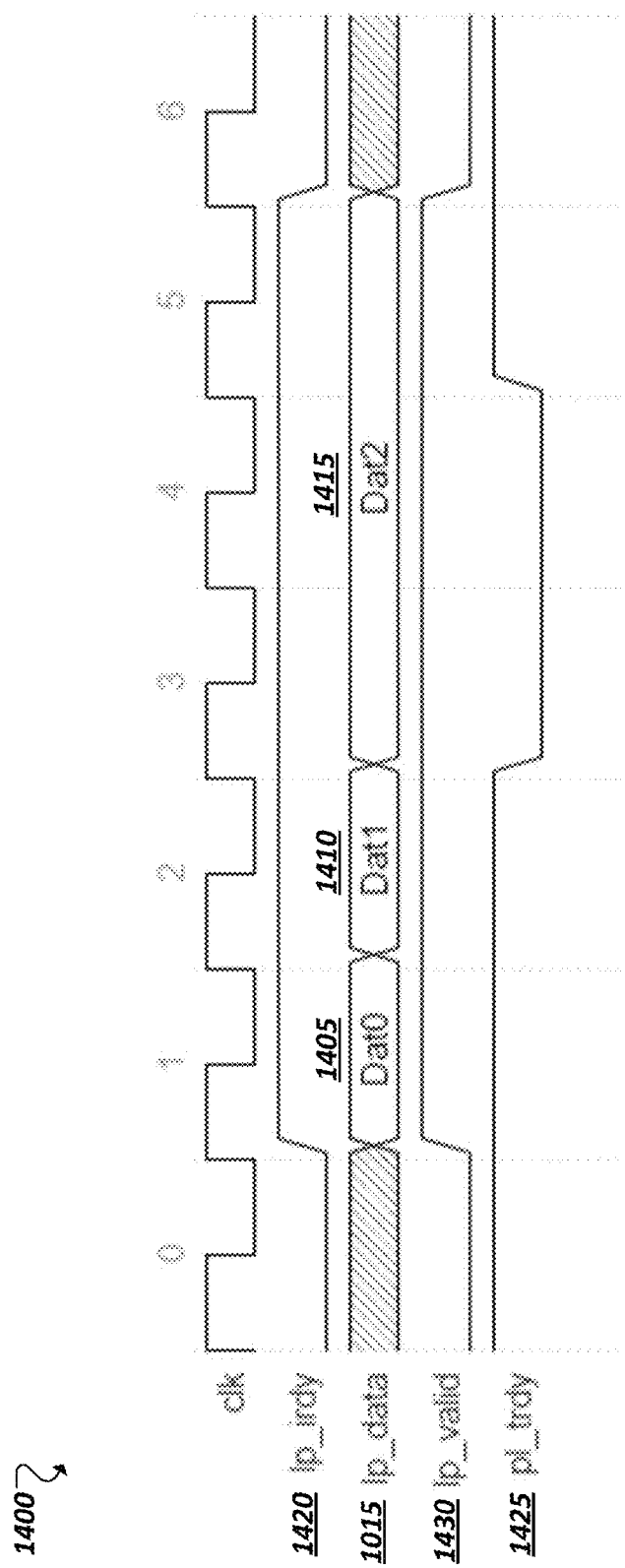
FIG. 14 is a diagram illustrating signaling associated with data transfers over an example adapter interface.

Turning to FIG. 14, a signal diagram 1400 is shown illustrating example signaling associated with LPIF data transfers. In some implementations, when a link layer controller is sending data to the physical layer (through an adapter), data (e.g., 1405, 1410, 1415) is to be transferred (on data lanes 1015) while a lp_irdy (1420) (a signal to indicate indicating the link layer is ready to transfer data), a pl_trdy (1425) (a signal to indicate that the physical layer is ready to accept data), and a lp_valid (1430) signal (to indicate that data sent on the link-layer-to-physical-layer is valid) are asserted. In some cases, no limitations may be defined regarding when pl_trdy can de-assert or for how many cycles it remains de-asserted before it is asserted again, although, in some implementations, rules or policies may be enforced or guaranteed by the adapter or PHY for deassertion and reassertion of pl_trdy. Analogous protocols and signals (e.g., pl_valid to indicate that data sent on the physical-layer-to-link-layer is valid) may be utilized for data transfer from the physical layer to the link layer through an adapted. In some implementations, when data is being sent from the physical layer to the link layer, no backpressure mechanism may be enforced and data may be transferred whenever pl_valid is asserted, among other example features.

In some examples, LPIF may define a Stall Req/Ack handshake mechanism to be used by the physical layer to interrupt the packet transfers by the upper layer controllers (e.g., in conditions where it is required by the upper layers to transmit aligned packets to guarantee correct framing alignment and identification by the receiving link layer). The Stall Req/Ack handshake may be used when exiting Active state. It is also permissible to use the mechanism and remain in Active through the entire handshake. Link layers that don't utilize the Stall Req/ACK mechanism may, for example, flop the stallreq and feed the flop output back as stallack. LPIF may define a nonblocking stallreq handshake (pl_nbstallreq/lp_nbstallack) to be used for alignment related stalls, and pl_stallreq to be used for state transitions. FIG. 15 shows a signaling diagram 1500 illustrating an example implementation of a Stall Req/Ack handshake (using a stall request signal 1505 and stall acknowledgement signal 1510).

Some implementations may utilize stream signals to identify a stream ID associated with data sent over the interface. The stream ID may identify, which of potentially multiple different supported protocols, is to be associated with corresponding data sent on the interface. For instance, a lp_stream[7:0] signal and a pl_stream[7:0] signal may be provided to carry the encoded value that indicates the StreamID number for the protocol. In one example, the field may be 8 bits wide, with the definition of the streamID fields being implementation specific.

In some instances, the StreamID signal may be tied or strapped to a particular value (e.g., where the link layer controller does not support StreamID signals or where only a single protocol is used). A Link Layer controller is permitted to provide the StreamID signals (e.g., in both directions). For instance, the streamID signals must be connected between the Link Layer and ARB/MUX or PHY. The allocation of the StreamID encoding may be done by the Link Layer, and the driver of the pl_stream[7:0] may decode the received StreamID and forward the packets to the Link Layer associated with the received StreamID. When connected to an ARB/MUX, the ARB/MUX may also include logic to be aware of the StreamID allocation and association with Link Layer.

An LPIF implementations may additionally define state request and status signals for use in transitioning between states defined in an LPIF-based state machine. For instance, values of a lp_state_req signal may be indicate the LPIF state requested by the Link Layer, and the signal pl_state_sts reflects the state status of the LPIF interface.

Some implementations may also provide a configuration interface to facilitate sideband transfer of information between the link layer and the adapter. As an example, Link Layer can use this interface to read registers in the adapter, among other example uses.

FIGS. 16A-16F illustrate example signaling diagrams 1600a-f to illustrate various transaction flows involving example adapter devices (e.g., 805a, 805b), such as described above. Each adapter 805a, 805b may be provided on a respective die (e.g., 1605a, 1605b) interconnected by a die-to-die PHY 815. One or more upper layer controllers (e.g., link layer circuitry) may be provided on each die and coupled to a respective one of the adapter devices (e.g., 805a, 805b) by a link layer-to-PHY interface 1610a, 1610b (e.g., an interface defined in accordance with a particular protocol). In the examples of FIGS. 16A-16F, LPIF-based adapters are provided, each coupled to a respective LPIF interface (e.g., 1610a, 1610b). It should be appreciated, however, that other non-LPIF-based adapters may be utilized and implement the same or similar features to those discussed herein.

Figure 16A:
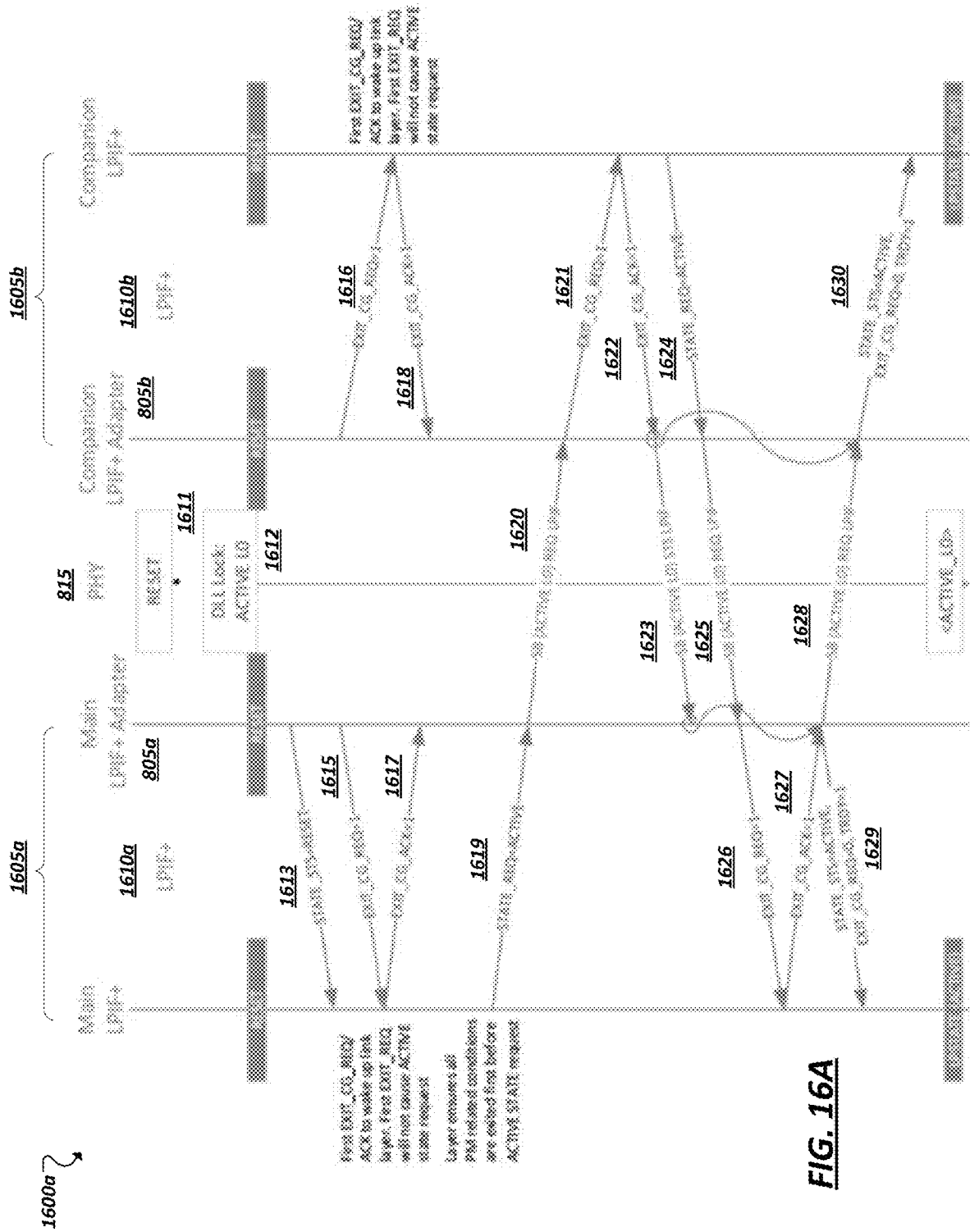
FIGS. 16A-16F illustrate simplified flow diagrams illustrating example signaling between dies using example adapters.

FIG. 16A shows an example boot flow from Reset to Active. The PHY begins in a Reset state (1611) and transitions into Active L0 (1612). For instance, the PHY 815 comes out of Reset and performs training to enter the Active L0 state. One or more wires (and corresponding signals) may be defined and included on the PHY (e.g., a DLL Lock wire/signal) to indicate that the PHY has trained up to the target data rate and is in an active state. Each adapter (e.g., 805a, 805b) may detect the signal on the PHY and thereby identify that the PHY has entered the Active state and initially transmit state status (STATE_STS) signals (1613) to indicate that the LPIF interface is currently in Reset before attempting to initiate activation of the LPIF interface (e.g., 1610a, 1610b) by exiting clock gating through an exit clock gating request, EXIT_CG_REQ (1615, 1616). The link layer may send back an exit clock gating acknowledgment (1617, 1618), which may cause the link layer to be awakened. When one of the link layers (e.g., the link layer on the "main" die (e.g., one die may be main and other "companion" from an application viewpoint, power management perspective, etc.)) determines that power management related conditions have been exited, it may send a request to enter an active transmitting state (STATE_REQ=ACTIVE 1619) with the other die over the PHY 815. The adapter may utilize the sideband channel of the interface coupling the adapter (e.g., 805*a*) to the PHY 815 to transmit a sideband request 1620 (to be delivered over the PHY 815 to the other adapter (e.g., 805*b*) to enter an Active L0 state. In some implementations, when the PHY 815 exits Reset to an Active state, it remains in the active state (e.g., L0) until transitions back to reset. In other words, no low power, partial width, or other states may be actually entered on the PHY 815—instead, the adapters maintain different "states" while the PHY remains in active, among other example implementations.

Continuing with the example of FIG. 16A, upon receiving the sideband request 1620 to enter Active L0, the receiving adapter 805*b* may send a second clock gating exit request 1621 to the link layer. In some implementations, the first clock gating exit request (e.g., 1615, 1616) sent after reset may be defined to not cause or correspond to an Active state request. Accordingly, following the second clock gating exit request 1621, the link layer controller may send an acknowledgement 1622 over the LPIF interface 1610*b*. the adapter 805*b*, in response, may send a sideband status signal 1623 identifying that the adapter 805*b* has entered the Active L0 state (e.g., as defined in LPIF). In this example, the handshake may additionally involve the link layer sending a corresponding active state request 1624, which causes the corresponding adapter 805*b* to send a sideband request 1625 to enter Active L0 (to adapter 805*a*). The receiving adapter may likewise, upon receiving the sideband request 1625, send a second clock gating exit request 1626 to its corresponding link layer controller. Upon receiving an acknowledgement 1627 from the link layer, the adapter 805*a* may likewise respond with a sideband status signal 1628. The adapter, upon sending this signal 1628 may send a state status active signal 1629 (with a deasserted clock gating exist signal and assertion of the trdy signal (which indicates that the adapter is ready to receive data from the link layer for transmission over the PHY 815). Correspondingly, upon receiving sideband status signal 1628, adapter 805*b* may generate a similar state status active signal 1630 to indicate to its corresponding link layer controller (over LPIF 1610*b*) that the link is active and ready for data from the link layer.

Figure 16B:
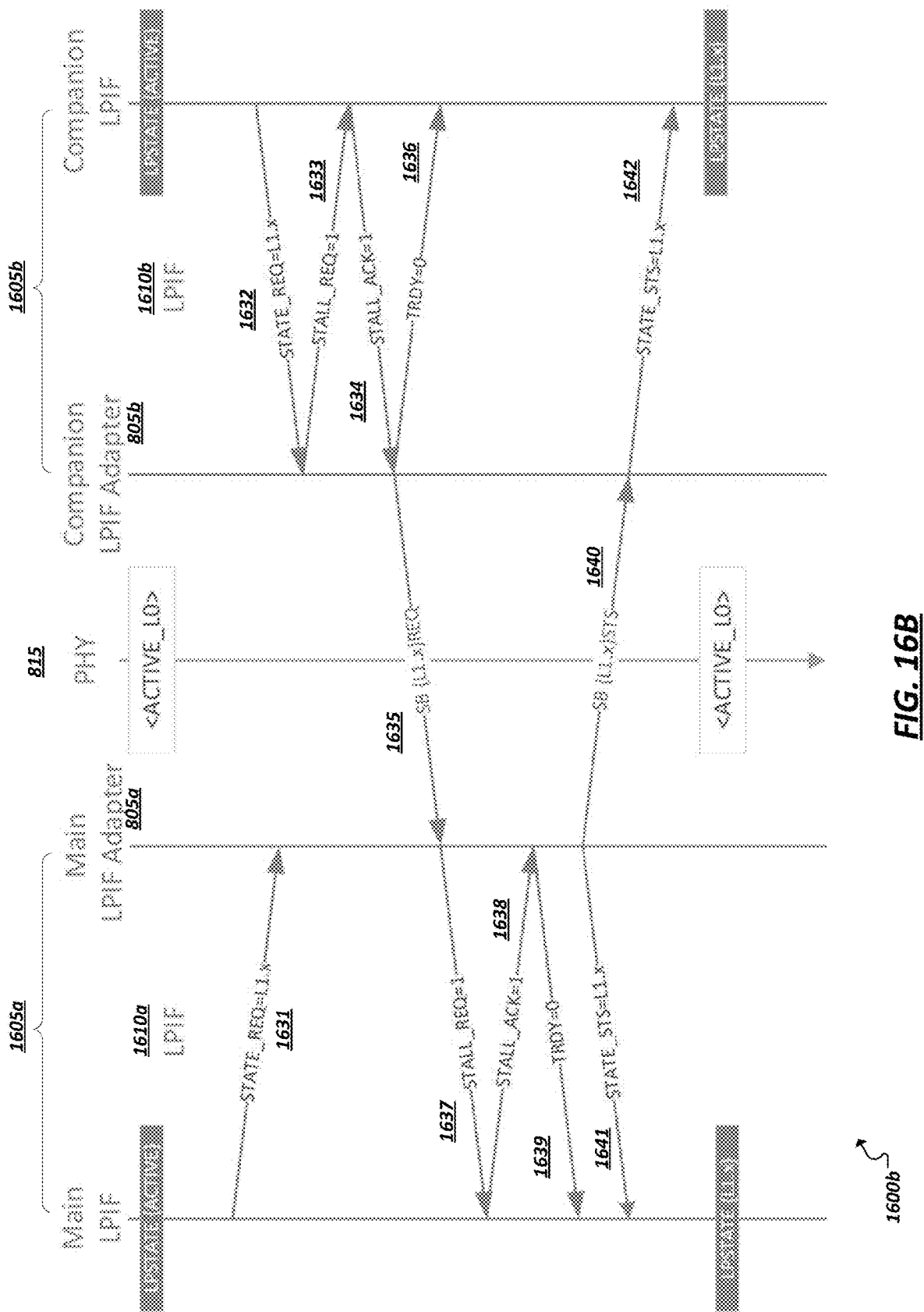

Turning to FIG. 16B, an example entry into an L1 interface state (e.g., LPIF L1 state) from an active L0 state using an adapter is shown. In some implementations, either die and corresponding adapter may request transitions between active and low power states, although, in some implementation, designation of one die as "main" or "companion" may implicitly or explicitly conform to rules that have one or the other die always initiating at least some of the state transitions. For instance, in one example, the sideband request is to be initiated by the companion die to keep it consistent with requirements or conventions of a corresponding protocol (e.g., CXL, PCIe, etc.), with the main die waiting to take action if it has received both a request from its link layer controller (e.g., 1631) and received a corresponding sideband request notification (e.g., 1635) from the companion die, among other example rules, applications, and flows. As noted above, in some examples, the PHY 815 may remain in an active state, despite the adapters and link layers transitioning between interface-defined link states (e.g., between L0-L1-L2, etc.). The PHY 815 may rely on dynamic clock gating for power savings while saving in Active. In other implementations, the PHY may support low power states, which may be triggered by signals from the adapter corresponding entry into an interface-defined low power state, among other example implementations. The link layers may clock gate themselves when there is no activity and allow other system-level (e.g., system on chip (SoC)) power management flows to complete.

Upon receiving a request to enter L1 from the link layer (e.g., STATE_REQ=L.1x (1632)), the adapter (e.g., 805*b*) may sent a stall request 1633 in response to request that the link layer desist from sending additional data. The link layer may acknowledge (at 1634) the stall request 1633. Upon receiving this acknowledgment 1634, the adapter may send a sideband signal 1635 to request entry into the L1 by the other adapter 805*a* and deassert the trdy signal (at 1636) to indicate that it is no longer to receive data from its corresponding link layer. The other adapter (e.g., 805*a*) upon receiving the sideband L1 entry request 1635 may send its own stall request 1637 to its corresponding link layer controller, which may acknowledge the stall (at 1638) to allow the adapter 805*a* to also deassert trdy on its interface (at 1639). The adapter 805*a* may then acknowledge the transition to L1 by sending a state status reply 1640 indicating entry into L1. The adapter 805*a* may send a corresponding status message 1641 to its link layer over its LPIF interface 1610*a*. Upon receiving state status reply 1640, adapter 805*a* may also send a status message 1642 to its link layer over its LPIF interface 1610*b*. The state of each of the LPIF interfaces (and adapters and link layers) may all now be in the defined L1 state (e.g., at 1643, 1644), while the PHY remains in Active L0 (at 1645), among other example implementations.

Figure 16C:
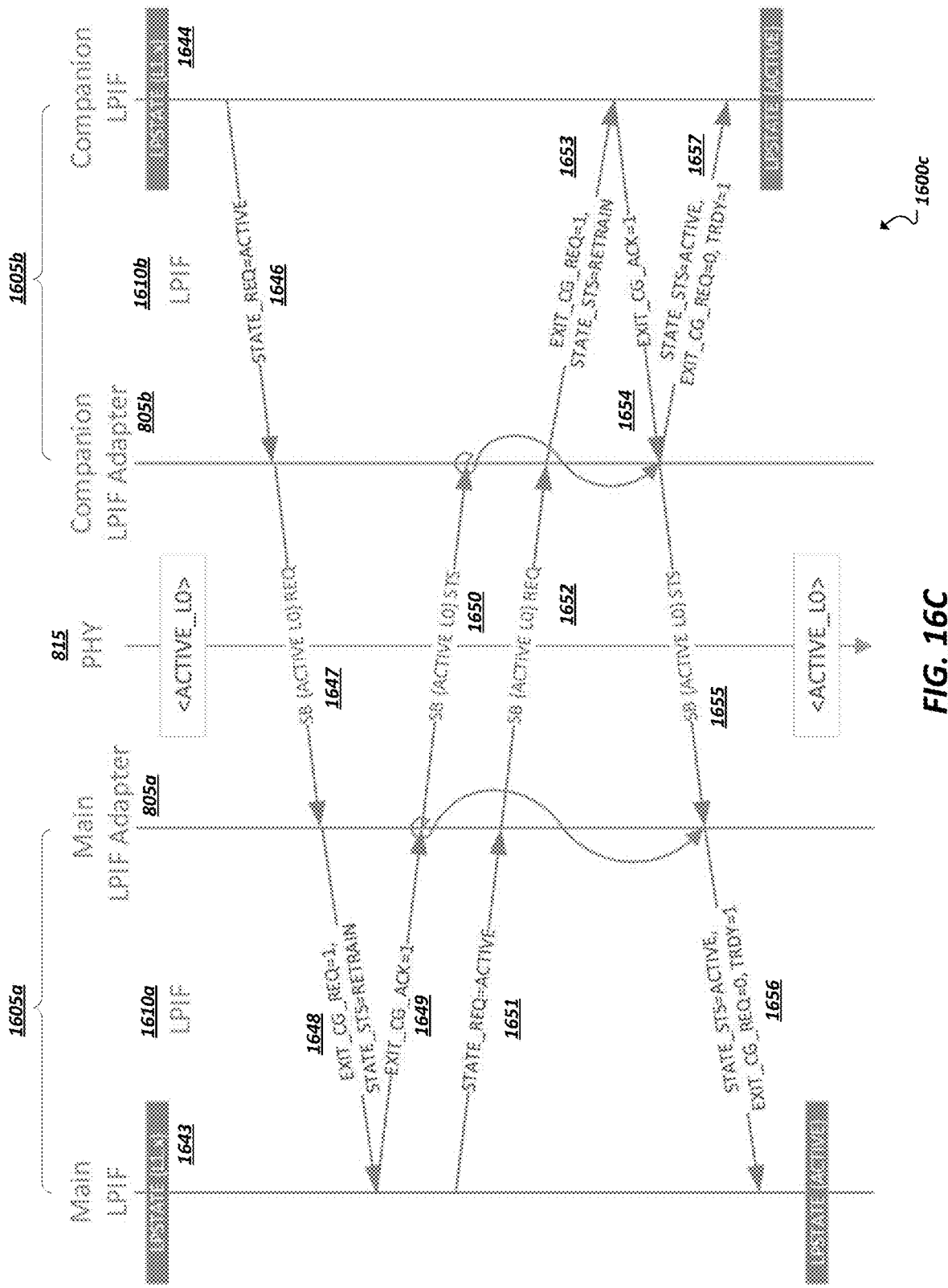

Turning to FIG. 16C, an example is shown of an exit from the L1 state back to an active L0 state. For instance, with the adapters 805*a,b* and LPIF interfaces 1610*a,b* in L1 (1643, 1644), one of the link layers may request a return to the active L0 state (e.g., at 1646). Upon receiving this request 1646, the adapter 805*b* generates and send a sideband request 1647 over the PHY 815 to enter active L0. The other adapter 805*a* may receive the sideband request 1647 and generate signals 1648 on LPIF interface 1610*a* to indicate a request to exit clock gating and indicate a state status of retraining to transition back to L0. The link layer may return an acknowledgement 1649 of the request to exit clock gating to the adapter 805*a*. In response, the adapter 805*a* may send a sideband status acknowledgement 1650 of the request to enter L0. A corresponding active state request 1651 may be sent from the link layer to the adapter 805*a* over LPIF interface 1610*a*, which may prompt the adapter 805*a* to generate and send a sideband request to enter active L0 (1652) over the PHY 815 to the other adapter 805*b*. The adapter 805*b*, upon receiving the sideband request 1652 may send an exit clock gating request 1653 to its associated link layer. The link layer, as with the other die, may send a clock gating exit acknowledgement 1654 to the adapter 805*b*. The adapter 805*b*, in response, may send a sideband acknowledgement 1655 over the PHY 815 to indicate that the adapter has also transitioned to the L0 state. Each of the adapters 805*a,b* may send a state status signal (e.g., 1656, 1657) to its associated link layer controller(s), along with de-asserting its clock gating exit signal, and asserting its trdy signal to indicate that the adapter is ready for data from its associated link layer pipe(s).

Figure 16D:
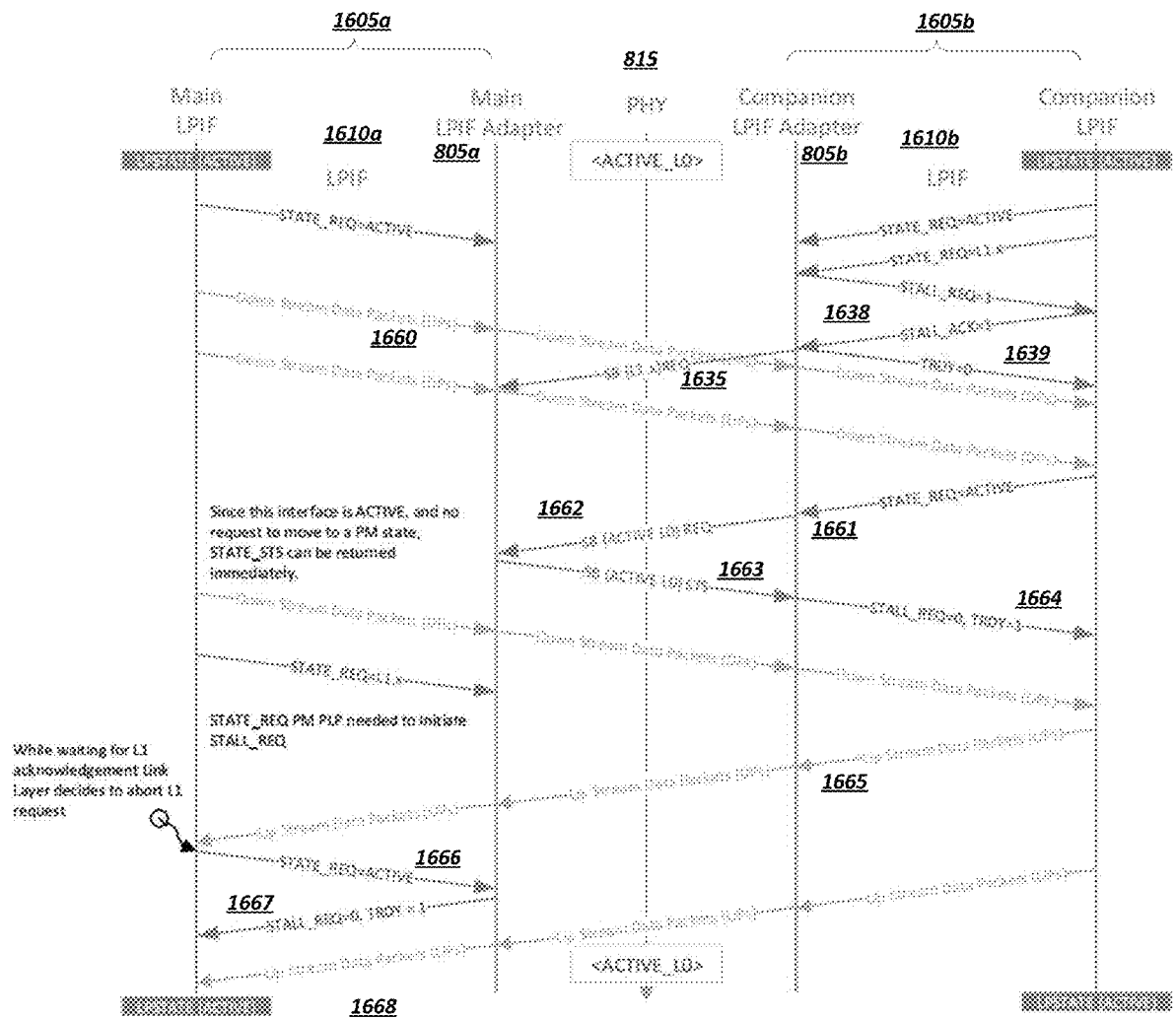

Turning to FIG. 16D, another example is shown of failed attempts to transition from an active transmitting state (e.g., L0) to a low power link state (e.g., L1). In the example of FIG. 16D, a handshake similar to that show in FIG. 16B is attempted to transition from LIPF L0 to L1. Indeed, the flow illustrated in the example of FIG. 16D may begin similar to that illustrated in FIG. 16B, with the link layer of the companion system signaling adapter 805b to attempt to transition the link to a low power (L1) state. However, in the example of FIG. 16D, the link layer on the "main" die may be sending downstream data packets (DPs) 1660 through adapter 805a and the PHY 815 to adapter 805b for delivery to the companion link layer. Accordingly, when the adapter 805a receives the sideband request 1635 to enter L1 it may determine that it is not positioned to enter L1 due to the packets it has to send. In this example, rather than sending an acknowledgement to the other adapter 805b (e.g., in the form of sideband status signal), the upstream adapter 805a may effectively ignore the request 1635 causing the link state to remain in LPIF L0.

As the downstream adapter 805b deasserted trdy=0 (at 1639) in concert with the receipt of stall acknowledgement 1638, the associated link layer may send a request 1661 to the adapter 805b to restore the link to an active state (e.g., based on identifying data that will soon need to be sent over the link). The adapter 805b may send a corresponding sideband request 1662 to enter Active L0. Because the upstream adapter has remained in an active state, and its corresponding LPIF interface 1610a is active, the adapter 805a may immediately return a state status acknowledgement signal 1663 over the PHY 815 to the other, downstream adapter 805b. In response, the adapter 805b may deassert the stall request signal and reassert trdy (at 1664) to indicate that the adapter 805b is again ready to accept data from its corresponding link layer pipe (over LPIF interface 1610b). Upstream data packets 1665 may then be sent over the PHY 815 to the other die (e.g., via adapter 805a). In this example, the controller corresponding to LPIF adapter 805a aborts the L1 entry request by sending a request 1666 to enter active, which the adapter 805a responds to with a STALL_REQ=0, TRDY=1 response 1667, allowing further upstream data packets 1668 to proceed, among other examples.

While the examples of FIGS. 16B-16D relate to signaling between an adapter and a PHY device (e.g., a die-to-die PHY) to transition to or from an L1 low power state, it should be appreciated that the more generalized principles and signaling patterns illustrated in these examples may be similarly applied to transitions between other states, including L1 substates, L2 or other low power link states, as well as other link states, which may be defined in a corresponding link-layer-to-PHY interface, with which the adapter is compatible (e.g., LPIF or other interface standards).

Figure 16E:
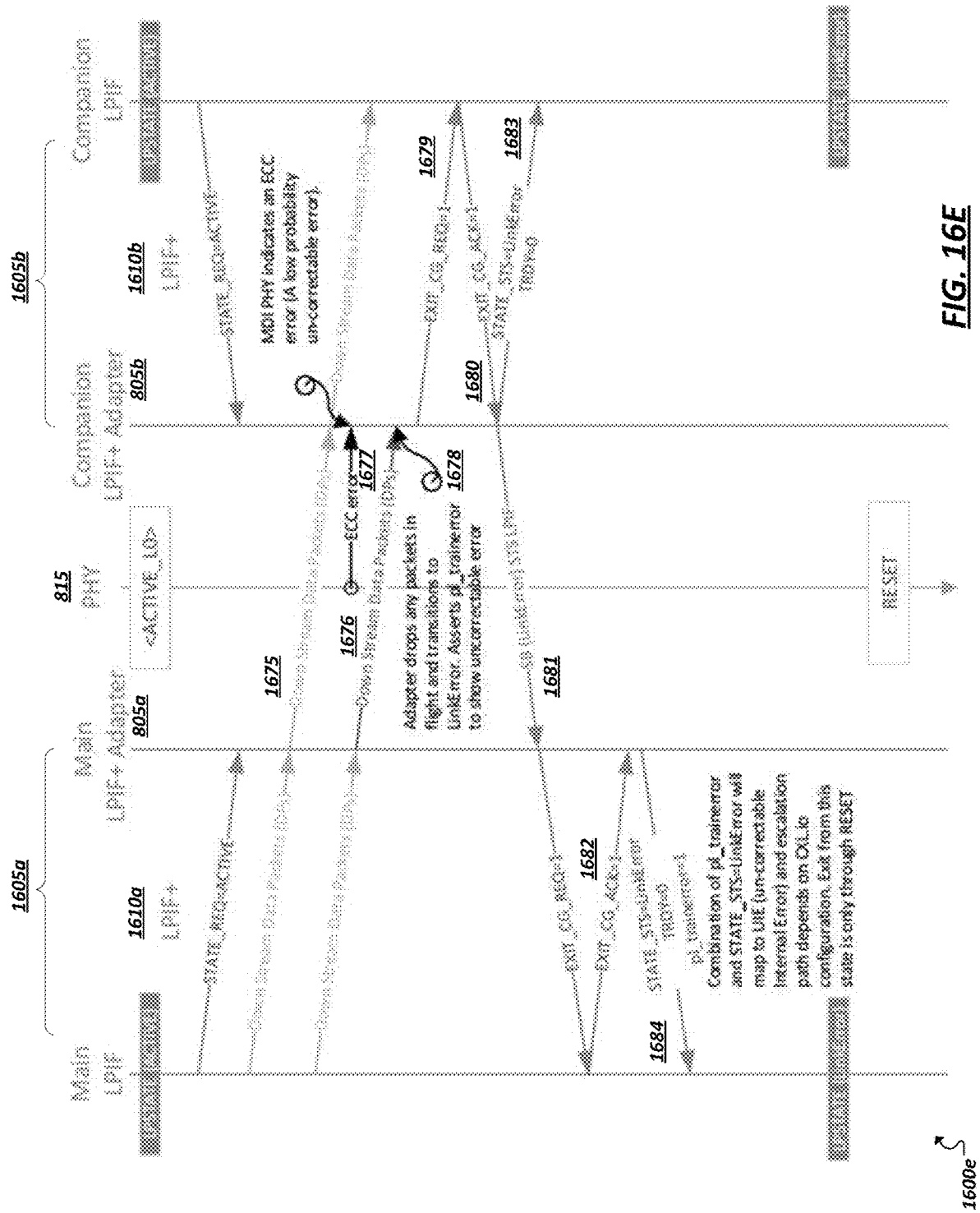

Turning to the example of FIG. 16E, an example is shown of handling of link errors in an example implementation of a PHY (e.g., 815) coupling to link-layer-to-PHY adapter devices (e.g., 805a,b). In this example, the PHY block may be equipped with error detection (e.g., error correction code-based) capabilities. In other instances, one or both adapters may also or alternatively be equipped with error detection functionality to identify errors in data (e.g., packet data) transmitted or received over the link connecting two dies. In still other examples, link layer controllers may also, or alternatively, be equipped with error detection capabilities, such as fatal error detection (which they may indicate through LPIF signaling to their adapter), among other example implementations.

In FIG. 16E, the link is in an active (e.g., L0) state and data packets (e.g., 1675) may be transmitted over the link. In this example, the PHY 815 may detect an error (e.g., an ECC error) in one or more of the data packets (e.g., at 1676) and signal 1677 the detection of the error to the adapter (e.g., 805b) that is to receive the packets containing the error. In response to receiving the error signal 1677, the adapter 805b may drop 1678 any packets in flight and initiate entry into a link error status. For instance, the adapter 805b may assert an exit clock gating request 1679, which may be acknowledged (at 1680) by the corresponding link layer controller (e.g., over LPIF interface 1610b). Upon receiving the acknowledgment 1680, the adapter 805b may send a sideband status message 1681 to indicate the link error to the other adapter 805a. Upon receiving the link error status signal 1681, the companion adapter 805a on the other die may likewise initiate entry into a link error state (for the interface 1610a) through an analogous clock gating exit handshake 1682. Upon completion of the clock gating exit handshakes (e.g., at 1679, 1680, 1682), each adapter may signal a state status message and deassert trdy (e.g., 1683, 1684) to stop packet transmission (e.g., to enter a recovery or error handling state). In some implementations, signals 1683, 1684 may additionally indicate a type of error and/or error training procedure to initiate for the identified link error, among other example implementations.

Figure 16F:
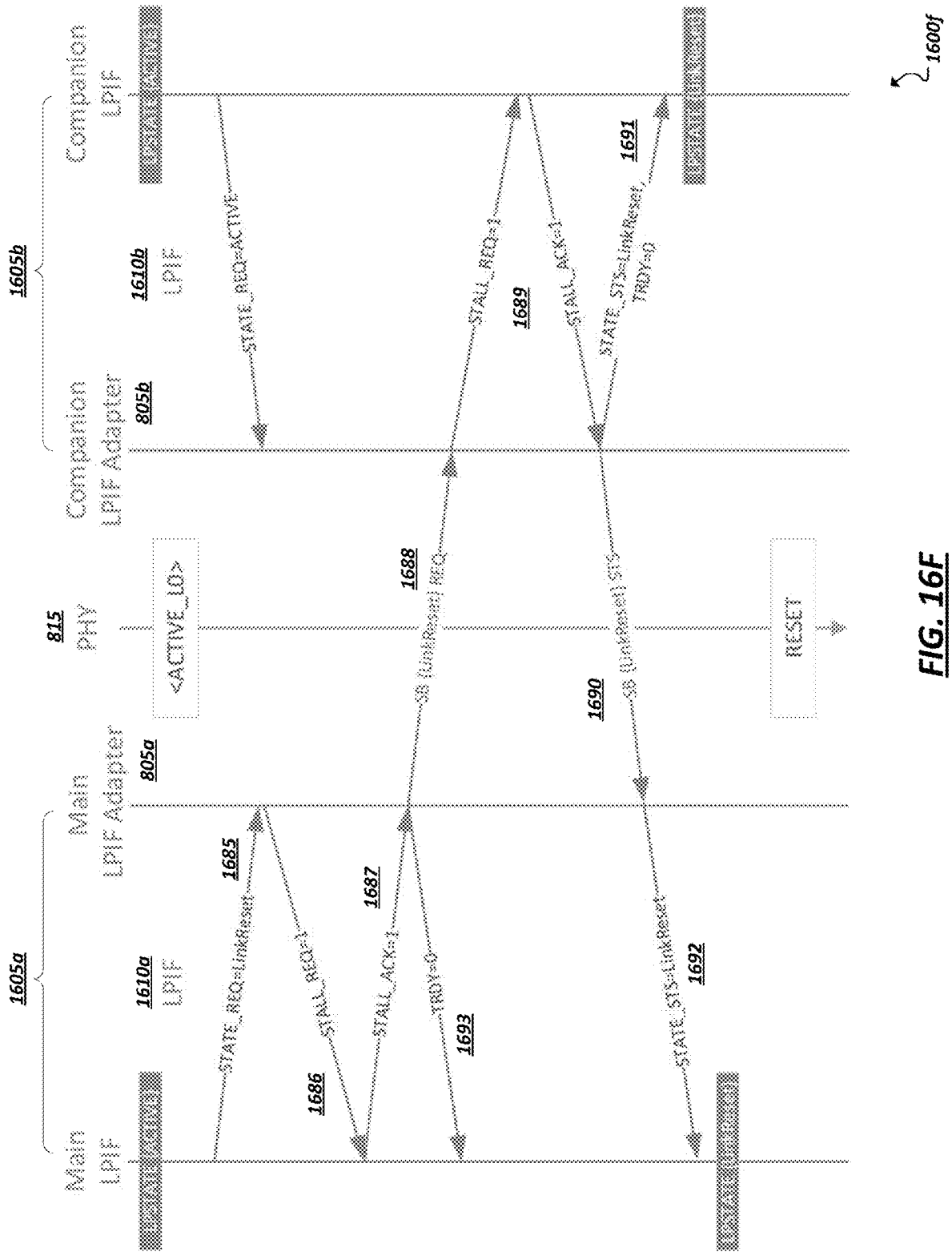

Turning to FIG. 16F, an example link reset flow is shown, which may be used to may be used to propagate reset from one die (e.g., the main die) to another die (e.g., the companion die ((analogous to HotReset in PCIe)). It may be assumed that protocol layers are quiesced before link layers initiates a link reset flow. In the example of FIG. 16F, the link is an active L0 state, when a request 1685 is sent from the host link layer to enter a LinkReset state. In response, the adapter 805a may sent assert a stall request signal (at 1686), which the link layer controller may acknowledge 1687 (through signaling over LPIF interface 1610a). Upon receiving the stall acknowledgement 1687, the adapter 805a may deassert trdy 1693 on the LPIF interface 1610a and send a sideband request 1688 over the PHY 815 to request entry into the LinkReset state. The companion adapter 805b may receive the sideband request 1688 and respond by initiating a similar stall request-acknowledgement handshake (e.g., 1689), which, upon completion, causes adapter 805b to respond with a sideband state status signal 1690 over PHY 815 acknowledging entry into the LinkReset state and signaling a state status for LinkReset and deassertion of trdy (at 1691) on its LPIF interface 1610b. Adapter 805a, upon receiving the sideband acknowledgement, may send a state status signal 1692 over LPIF interface 1610a. The PHY 815 may also progress to a RESET state (e.g., due to system on chip (SOC) RESET flow triggered at its interface to SoC).

Note that the apparatus', methods', and systems described above may be implemented in any electronic device or system as aforementioned. As specific illustrations, the figures below provide exemplary systems for utilizing the concepts as described herein. For instance, components illustrated in the following examples may be implemented on separate die, and interconnects facilitating die-to-die connections may include respective link-layer-to-PHY adapters, such as discussed above, to facilitate data transfer over die-to-die interconnects (e.g., implemented as dedicated die-to-die PHY blocks). As the systems below are described in more detail, a number of different interconnects are disclosed, described, and revisited from the discussion above. And as is readily apparent, the advances described above may be applied to any of those interconnects, fabrics, or architectures.

Figure 17:
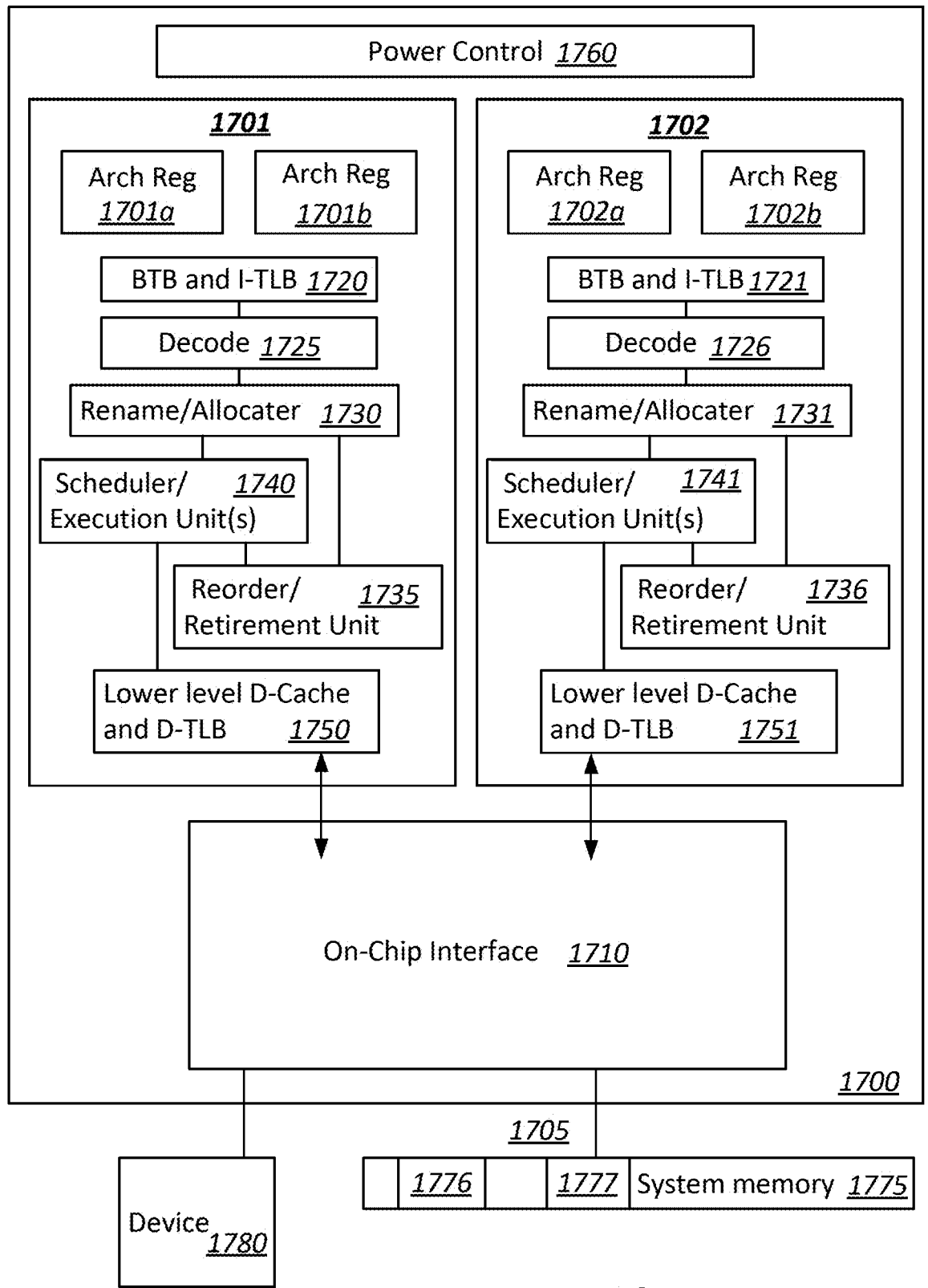
FIG. 17 illustrates an embodiment of a block diagram for a computing system including a multicore processor.

Referring to FIG. 17, an embodiment of a block diagram for a computing system including a multicore processor is depicted. Processor 1700 includes any processor or processing device, such as a microprocessor, an embedded processor, a digital signal processor (DSP), a network processor, a handheld processor, an application processor, a co-processor, a system on a chip (SOC), or other device to execute code. Processor 1700, in one embodiment, includes at least two cores—core 1701 and 1702, which may include asymmetric cores or symmetric cores (the illustrated embodiment). However, processor 1700 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1700, as illustrated in FIG. 17, includes two cores—core 1701 and 1702. Here, core 1701 and 1702 are considered symmetric cores, i.e. cores with the same configurations, functional units, and/or logic. In another embodiment, core 1701 includes an out-of-order processor core, while core 1702 includes an in-order processor core. However, cores 1701 and 1702 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such as a binary translation, may be utilized to schedule or execute code on one or both cores. Yet to further the discussion, the functional units illustrated in core 1701 are described in further detail below, as the units in core 1702 operate in a similar manner in the depicted embodiment.

As depicted, core 1701 includes two hardware threads 1701a and 1701b, which may also be referred to as hardware thread slots 1701a and 1701b. Therefore, software entities, such as an operating system, in one embodiment potentially view processor 1700 as four separate processors, i.e., four logical processors or processing elements capable of executing four software threads concurrently. As alluded to above, a first thread is associated with architecture state registers 1701a, a second thread is associated with architecture state registers 1701b, a third thread may be associated with architecture state registers 1702a, and a fourth thread may be associated with architecture state registers 1702b. Here, each of the architecture state registers (1701a, 1701b, 1702a, and 1702b) may be referred to as processing elements, thread slots, or thread units, as described above. As illustrated, architecture state registers 1701a are replicated in architecture state registers 1701b, so individual architecture states/contexts are capable of being stored for logical processor 1701a and logical processor 1701b. In core 1701, other smaller resources, such as instruction pointers and renaming logic in allocator and renamer block 1730 may also be replicated for threads 1701a and 1701b. Some resources, such as re-order buffers in reorder/retirement unit 1735, ILTB 1720, load/store buffers, and queues may be shared through partitioning. Other resources, such as general-purpose internal registers, page-table base register(s), low-level data-cache and data-TLB 1715, execution unit(s) 1740, and portions of out-of-order unit 1735 are potentially fully shared.

Processor 1700 often includes other resources, which may be fully shared, shared through partitioning, or dedicated by/to processing elements. In FIG. 17, an embodiment of a purely exemplary processor with illustrative logical units/resources of a processor is illustrated. Note that a processor may include, or omit, any of these functional units, as well as include any other known functional units, logic, or firmware not depicted. As illustrated, core 1701 includes a simplified, representative out-of-order (OOO) processor core. But an in-order processor may be utilized in different embodiments. The OOO core includes a branch target buffer 1720 to predict branches to be executed/taken and an instruction-translation buffer (I-TLB) 1720 to store address translation entries for instructions.

Core 1701 further includes decode module 1725 coupled to fetch unit 1720 to decode fetched elements. Fetch logic, in one embodiment, includes individual sequencers associated with thread slots 1701a, 1701b, respectively. Usually core 1701 is associated with a first ISA, which defines/specifies instructions executable on processor 1700. Often machine code instructions that are part of the first ISA include a portion of the instruction (referred to as an opcode), which references/specifies an instruction or operation to be performed. Decode logic 1725 includes circuitry that recognizes these instructions from their opcodes and passes the decoded instructions on in the pipeline for processing as defined by the first ISA. For example, as discussed in more detail below decoders 1725, in one embodiment, include logic designed or adapted to recognize specific instructions, such as transactional instruction. As a result of the recognition by decoders 1725, the architecture or core 1701 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1726, in one embodiment, recognize the same ISA (or a subset thereof). Alternatively, in a heterogeneous core environment, decoders 1726 recognize a second ISA (either a subset of the first ISA or a distinct ISA).

In one example, allocator and renamer block 1730 includes an allocator to reserve resources, such as register files to store instruction processing results. However, threads 1701a and 1701b are potentially capable of out-of-order execution, where allocator and renamer block 1730 also reserves other resources, such as reorder buffers to track instruction results. Unit 1730 may also include a register renamer to rename program/instruction reference registers to other registers internal to processor 1700. Reorder/retirement unit 1735 includes components, such as the reorder buffers mentioned above, load buffers, and store buffers, to support out-of-order execution and later in-order retirement of instructions executed out-of-order.

Scheduler and execution unit(s) block 1740, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1750 are coupled to execution unit(s) 1740. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1701 and 1702 share access to higher-level or further-out cache, such as a second level cache associated with on-chip interface 1710. Note that higher-level or further-out refers to cache levels increasing or getting further way from the execution unit(s). In one embodiment, higher-level cache is a last-level data cache—last cache in the memory hierarchy on processor 1700—such as a second or third level data cache. However, higher level cache is not so limited, as it may be associated with or include an instruction cache. A trace cache—a type of instruction cache—instead may be coupled after decoder 1725 to store recently decoded traces. Here, an instruction potentially refers to a macro-instruction (i.e. a general instruction recognized by the decoders), which may decode into a number of micro-instructions (micro-operations).

In the depicted configuration, processor 1700 also includes on-chip interface module 1710. Historically, a memory controller, which is described in more detail below, has been included in a computing system external to processor 1700. In this scenario, on-chip interface 1710 is to communicate with devices external to processor 1700, such as system memory 1775, a chipset (often including a memory controller hub to connect to memory 1775 and an I/O controller hub to connect peripheral devices), a memory controller hub, a northbridge, or other integrated circuit. And in this scenario, bus 1705 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1775 may be dedicated to processor 1700 or shared with other devices in a system. Common examples of types of memory 1775 include DRAM, SRAM, non-volatile memory (NV memory), and other known storage devices. Note that device 1780 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1700. For example, in one embodiment, a memory controller hub is on the same package and/or die with processor 1700. Here, a portion of the core (an on-core portion) 1710 includes one or more controller(s) for interfacing with other devices such as memory 1775 or a graphics device 1780. The configuration including an interconnect and controllers for interfacing with such devices is often referred to as an on-core (or un-core configuration). As an example, on-chip interface 1710 includes a ring interconnect for on-chip communication and a high-speed serial point-to-point link 1705 for off-chip communication. Yet, in the SOC environment, even more devices, such as the network interface, co-processors, memory 1775, graphics processor 1780, and any other known computer devices/interface may be integrated on a single die or integrated circuit to provide small form factor with high functionality and low power consumption.

In one embodiment, processor 1700 is capable of executing a compiler, optimization, and/or translator code 1777 to compile, translate, and/or optimize application code 1776 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 18:
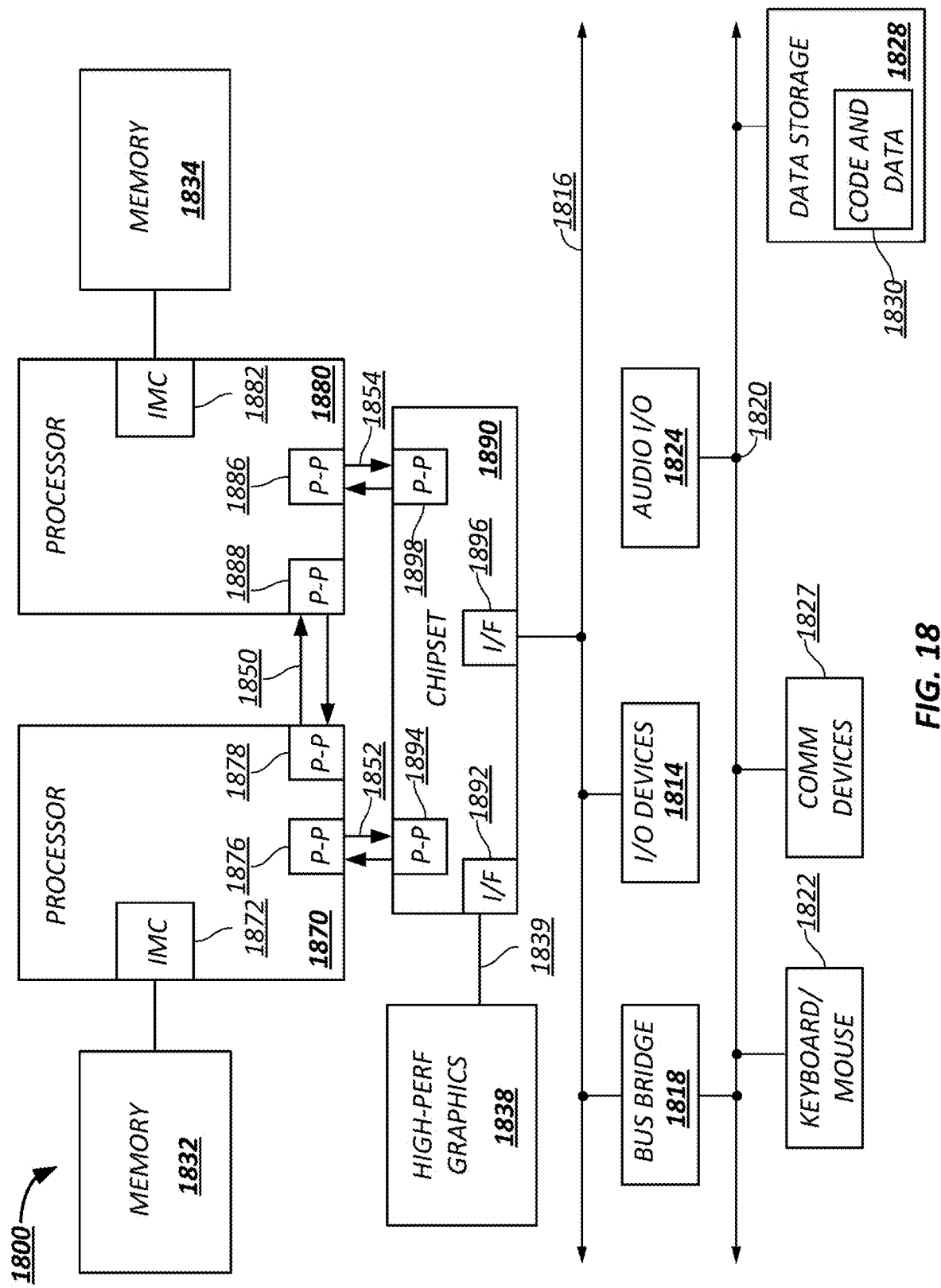
FIG. 18 illustrates another embodiment of a block diagram for a computing system.

Referring now to FIG. 18, shown is a block diagram of a second system 1800 in accordance with an embodiment of the present solutions. As shown in FIG. 18, multiprocessor system 1800 is a point-to-point interconnect system, and includes a first processor 1870 and a second processor 1880 coupled via a point-to-point interconnect 1850. Each of processors 1870 and 1880 may be some version of a processor. In one embodiment, 1852 and 1854 are part of a serial, point-to-point coherent (or non-coherent) interconnect fabric.

While shown with only two processors 1870, 1880, it is to be understood that the scope of the present disclosure is not so limited. In other embodiments, one or more additional processors may be present in a given processor.

Processors 1870 and 1880 are shown including integrated memory controller units 1872 and 1882, respectively. Processor 1870 also includes as part of its bus controller units point-to-point (P-P) interfaces 1876 and 1878; similarly, second processor 1880 includes P-P interfaces 1886 and 1888. Processors 1870, 1880 may exchange information via a point-to-point (P-P) interface 1850 using P-P interface circuits 1878, 1888. As shown in FIG. 18, IMCs 1872 and 1882 couple the processors to respective memories, namely a memory 1832 and a memory 1834, which may be portions of main memory locally attached to the respective processors.

Processors 1870, 1880 each exchange information with a chipset 1890 via individual P-P interfaces 1852, 1854 using point to point interface circuits 1876, 1894, 1886, 1898. Chipset 1890 also exchanges information with a high-performance graphics circuit 1838 via an interface circuit 1892 along a high-performance graphics interconnect 1839.

A shared cache (not shown) may be included in either processor or outside of both processors; yet connected with the processors via P-P interconnect, such that either or both processors' local cache information may be stored in the shared cache if a processor is placed into a low power mode.

Chipset 1890 may be coupled to a first bus 1816 via an interface 1896. In one embodiment, first bus 1816 may be a Peripheral Component Interconnect (PCI) bus, or a bus such as a PCI Express bus or another third generation I/O interconnect bus, although the scope of the present disclosure is not so limited.

As shown in FIG. 18, various I/O devices 1814 are coupled to first bus 1816, along with a bus bridge 1818 which couples first bus 1816 to a second bus 1820. In one embodiment, second bus 1820 includes a low pin count (LPC) bus. Various devices are coupled to second bus 1820 including, for example, a keyboard and/or mouse 1822, communication devices 1827 and a storage unit 1828 such as a disk drive or other mass storage device which often includes instructions/code and data 1830, in one embodiment. Further, an audio I/O 1824 is shown coupled to second bus 1820. Note that other architectures are possible, where the included components and interconnect architectures vary. For example, instead of the point-to-point architecture of FIG. 18, a system may implement a multi-drop bus or other such architecture.

Computing systems can include various combinations of components. These components may be implemented as ICs, portions thereof, discrete electronic devices, or other modules, logic, hardware, software, firmware, or a combination thereof adapted in a computer system, or as components otherwise incorporated within a chassis of the computer system. However, it is to be understood that some of the components shown may be omitted, additional components may be present, and different arrangement of the components shown may occur in other implementations. As a result, the features and components described above may be implemented in any portion of one or more of the interconnects illustrated or described below.

A processor, in one embodiment, includes a microprocessor, multi-core processor, multithreaded processor, an ultra-low voltage processor, an embedded processor, or other known processing element. In the illustrated implementation, processor acts as a main processing unit and central hub for communication with many of the various components of the system. As one example, processor is implemented as a system on a chip (SoC). As a specific illustrative example, processor includes an Intel® Architecture Core™-based processor such as an i3, i5, i7 or another such processor available from Intel Corporation, Santa Clara, CA. However, understand that other low power processors such as available from Advanced Micro Devices, Inc. (AMD) of Sunnyvale, CA, a MIPS-based design from MIPS Technologies, Inc. of Sunnyvale, CA, an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instruction set that performs defined algorithms as set forth by the processor licensor. Here, the microarchitectural implementation may vary, but the architectural function of the processor is usually consistent. Certain details regarding the architecture and operation of processor in one implementation will be discussed further below to provide an illustrative example.

Processor, in one embodiment, communicates with a system memory. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (13P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage may also couple to processor. In various embodiments, to enable a thinner and lighter system design as well as to improve system responsiveness, this mass storage may be implemented via an SSD. However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. A flash device may be coupled to processor, e.g., via a serial peripheral interface (SPI). This flash device may provide for non-volatile storage of system software, including a basic input/output software (BIOS) as well as other firmware of the system.

In various embodiments, mass storage of the system is implemented by an SSD alone or as a disk, optical or other drive with an SSD cache. In some embodiments, the mass storage is implemented as an SSD or as an HDD along with a restore (RST) cache module. In various implementations, the HDD provides for storage of between 320 GB-4 terabytes (TB) and upward while the RST cache is implemented with an SSD having a capacity of 24 GB-256 GB. Note that such SSD cache may be configured as a single level cache (SLC) or multi-level cache (MLC) option to provide an appropriate level of responsiveness. In an SSD-only option, the module may be accommodated in various locations such as in a mSATA or NGFF slot. As an example, an SSD has a capacity ranging from 120 GB-1 TB.

Various peripheral devices may couple to processor via a low pin count (LPC) interconnect. In the embodiment shown, various components can be coupled through an embedded controller. Such components can include a keyboard (e.g., coupled via a PS2 interface), a fan, and a thermal sensor. In some embodiments, touch pad may also couple to EC via a PS2 interface. In addition, a security processor such as a trusted platform module (TPM) in accordance with the Trusted Computing Group (TCG) TPM Specification Version 1.2, dated Oct. 2, 2003, may also couple to processor via this LPC interconnect. However, understand the scope of the present disclosure is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full-size SD-XC card reader and/or a SIM card reader for WWAN (e.g., an 8-pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System can communicate with external devices in a variety of manners, including wirelessly. In some instances, various wireless modules, each of which can correspond to a radio configured for a particular wireless communication protocol, are present. One manner for wireless communication in a short range such as a near field may be via a near field communication (NFC) unit which may communicate, in one embodiment with processor via an SMBus. Note that via this NFC unit, devices in close proximity to each other can communicate. For example, a user can enable system to communicate with another (e.g.,) portable device such as a smartphone of the user via adapting the two devices together in close relation and enabling transfer of information such as identification information payment information, data such as image data or so forth. Wireless power transfer may also be performed using an NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

Further, additional wireless units can include other short-range wireless engines including a WLAN unit and a Bluetooth unit. Using WLAN unit, Wi-Fi™ communications in accordance with a given Institute of Electrical and Electronics Engineers (IEEE) 802.11 standard can be realized, while via Bluetooth unit, short range communications via a Bluetooth protocol can occur. These units may communicate with processor via, e.g., a USB link or a universal asynchronous receiver transmitter (UART) link. Or these units may couple to processor via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit which in turn may couple to a subscriber identity module (SIM). In addition, to enable receipt and use of location information, a GPS module may also be present. WWAN unit and an integrated capture device such as a camera module may communicate via a given USB protocol such as a USB 2.0 or 3.0 link, or a UART or I²C protocol. Again, the actual physical connection of these units can be via adaptation of a NGFF add-in card to an NGFF connector configured on the motherboard.

In a particular embodiment, wireless functionality can be provided modularly, e.g., with a WiFi™ 802.11 ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition, NFC support may be provided via a separate device or multi-function device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high-resolution camera, e.g., having a resolution of at least 2.0 megapixels (MP) and extending to 6.0 MP and beyond.

To provide for audio inputs and outputs, an audio processor can be implemented via a digital signal processor (DSP), which may couple to processor via a high definition audio (HDA) link. Similarly, DSP may communicate with an integrated coder/decoder (CODEC) and amplifier that in turn may couple to output speakers which may be implemented within the chassis. Similarly, amplifier and CODEC can be coupled to receive audio inputs from a microphone which in an embodiment can be implemented via dual array microphones (such as a digital microphone array) to provide for high quality audio inputs to enable voice-activated control of various operations within the system. Note also that audio outputs can be provided from amplifier/CODEC to a headphone jack.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC may be sent to the PCH instead of the processor during the connected standby state so that the PCH can manage the wakeup processing instead of the processor. In addition, the TSC is maintained in the PCH to facilitate sustaining processor architectural functions.

Power control in the processor can lead to enhanced power savings. For example, power can be dynamically allocated between cores, individual cores can change frequency/voltage, and multiple deep low power states can be provided to enable very low power consumption. In addition, dynamic control of the cores or independent core portions can provide for reduced power consumption by powering off components when they are not being used.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

While the above solutions have been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The following examples pertain to embodiments in accordance with this Specification. Example 1 is an apparatus including: an adapter including: a first interface to couple to a particular device, where link layer data is to be communicated over the first interface; a second interface to couple to a physical layer (PHY) device, where the PHY device includes a plurality of wires to implement a physical layer of a link, the link couples the adapter to another adapter via the PHY device, and the second interface includes: a data channel to communicate the link layer data over the physical layer; and a sideband channel to communicate sideband messages between the adapter and the other adapter over the physical layer; and circuitry to implement a logical PHY for the link.

Example 2 includes the subject matter of example 1, where the data channel includes a first set of pins and the sideband channel includes a different second set of pins.

Example 3 includes the subject matter of any one of examples 1-2, where the particular device includes one of a link layer controller or a multiplexer to multiplex data of a plurality of link layers.

Example 4 includes the subject matter of example 3, where the particular device includes a plurality of link layer controllers to implement link layers of a plurality of different interconnect protocols.

Example 5 includes the subject matter of example 4, where the plurality of different interconnect protocols includes a Peripheral Component Interconnect Express (PCIe)-based protocol.

Example 6 includes the subject matter of any one of examples 4-5, where the plurality of different interconnect protocols includes two or more of a Compute Express Link (CXL) memory protocol, CXL cache protocol, or CXL I/O protocol.

Example 7 includes the subject matter of any one of examples 1-6, where the link is to couple a first die to a second die, the first die is to include the adapter and the second die is to include the other adapter.

Example 8 includes the subject matter of any one of examples 1-7, where the first interface is according to a link-layer-to-PHY interface standard.

Example 9 includes the subject matter of example 8, where the link-layer-to-PHY interface standard includes a Logical PHY Interface Specification (LPIF) interface.

Example 10 includes the subject matter of any one of examples 8-9, where the adapter further includes state machine circuitry to implement at least a portion of a state machine defined by the link-layer-to-PHY interface standard.

Example 11 includes the subject matter of example 10, where the state machine defines transitions between a plurality of link states, and the sideband messages are to be used to coordinate transitions between the plurality of link states between the adapter and the other adapter.

Example 12 includes the subject matter of any one of examples 1-11, where the second interface further includes a valid channel to indicate that valid data is being sent over the second interface.

Example 13 includes the subject matter of example 12, where the valid channel is to be asserted to indicate that either valid data is being sent on the data channel or valid sideband messages are being sent on the sideband channel.

Example 14 includes the subject matter of any one of examples 1-13, where the second interface further includes a stream channel to carry a stream signal to identify a particular protocol used by data sent on the data channel.

Example 15 is a method including: receiving particular data at a first interface of an adapter device, where the first interface is based on a link-layer-to-PHY interface standard, and the particular data is based on the link-layer-to-PHY interface standard and indicates a request to transition to an active link state defined in a state machine; sending a request sideband signal on a second interface of the adapter device, where the second interface couples the adapter device to a PHY device, the second interface includes a data channel and a separate sideband channel, the PHY device includes a plurality of physical connectors to implement a physical layer of a link, and the sideband signal is to be sent to another adapter device coupled to the PHY device and indicates a request to enter the active link state; receiving an acknowledgement sideband signal on the sideband channel of the second interface from the other adapter device to acknowledge the request to enter the active link state; sending a signal on the first interface to indicate that the adapter device is prepared to receive link layer data to communicate on the link; receiving the link layer data; and transmitting the link layer data on the data channel of the second interface to transmit the link layer data to the other adapter device over the PHY device based on entry to the active link state.

Example 16 includes the subject matter of example 15, further including: receiving a request sideband signal on the sideband channel of the second interface, where the received request sideband signal indicates a request to enter a low power link state; communicating a set of signals on the first interface to initiate clock gating based on the request to enter the low power link state; sending an acknowledgement sideband signal on the sideband channel of the second interface to acknowledge the request to enter the low power link state; and transitioning from the active link state to the low power link state on the adapter.

Example 17 includes the subject matter of example 16, where the PHY device is to remain in an active state after the adapter transitions to the low power link state.

Example 18 includes the subject matter of any one of examples 15-17, where the data channel includes a first set of pins and the sideband channel includes a different second set of pins.

Example 19 includes the subject matter of any one of examples 15-18, where the first interface couples the adapter device to a particular device, and the particular device includes one of a link layer controller or a multiplexer to multiplex data of a plurality of link layers.

Example 20 includes the subject matter of example 19, where the particular device includes a plurality of link layer controllers to implement link layers of a plurality of different interconnect protocols.

Example 21 includes the subject matter of example 20, where the plurality of different interconnect protocols includes a Peripheral Component Interconnect Express (PCIe)-based protocol.

Example 22 includes the subject matter of any one of examples 20-21, where the plurality of different interconnect protocols includes two or more of a Compute Express Link (CXL) memory protocol, CXL cache protocol, or CXL I/O protocol.

Example 23 includes the subject matter of any one of examples 15-22, where the link is to couple a first die to a second die, the first die is to include the adapter and the second die is to include the other adapter.

Example 24 includes the subject matter of any one of examples 15-23, where the link-layer-to-PHY interface standard includes a Logical PHY Interface Specification (LPIF) interface.

Example 25 includes the subject matter of any one of examples 15-24, where the adapter further includes state machine circuitry to implement at least a portion of a state machine defined by the link-layer-to-PHY interface standard.

Example 26 includes the subject matter of example 25, where the state machine defines transitions between a plurality of link states, and the sideband messages are to be used to coordinate transitions between the plurality of link states between the adapter and the other adapter.

Example 27 includes the subject matter of any one of examples 15-26, where the second interface further includes a valid channel to indicate that valid data is being sent over the second interface.

Example 28 includes the subject matter of example 27, where the valid channel is to be asserted to indicate that either valid data is being sent on the data channel or valid sideband messages are being sent on the sideband channel.

Example 29 includes the subject matter of any one of examples 15-28, where the second interface further includes a stream channel to carry a stream signal to identify a particular protocol used by data sent on the data channel.

Example 30 is a system including means to perform the method of any one of examples 15-29.

Example 31 includes the subject matter of example 30, where the means include a storage medium with instructions stored thereon, the instructions executable by a machine to cause the machine to perform at least a portion of the method of any one of examples 15-29.

Example 32 includes the subject matter of example 30, where the means include hardware circuitry to perform at least a portion of the method of any one of examples 15-29.

Example 33 is a system including: a first die including: link layer circuitry to implement a link layer of a protocol; an adapter including: a first interface, where link layer data associated with the link layer circuitry is to be communicated over the first interface; a second interface to couple to a physical layer (PHY) device, where the PHY device includes a plurality of wires to implement a physical layer of a link, the link is to couple the first die to a second die via the PHY device, and the second interface includes: a data channel to communicate the link layer data to the PHY device for communication on the link; and a sideband channel to communicate sideband messages between the adapter and another adapter on the second die; and circuitry to implement a logical PHY for the link.

Example 34 includes the subject matter of example 33, further including: the PHY device; and the second die, where the second die includes the other adapter, and the other adapter includes a respective data channel and a respective sideband channel to couple to the PHY device.

Example 35 includes the subject matter of any one of examples 33-34, where the link layer circuitry includes first link layer circuitry to implement a link layer of a first interconnect protocol, and the first die further includes second link layer circuitry to implement a link layer of a different, second interconnect protocol.

Example 36 includes the subject matter of example 35, where the adapter includes a first adapter, and the die includes a second adapter to be coupled between the second link layer circuitry and the physical layer of the link, where the second adapter implements at least a portion of the logical PHY for the link.

Example 37 includes the subject matter of any one of examples 35-36, where the first die further includes arbitration/multiplexing (ARB/MUX) circuitry to couple to each of the first and second link layer circuitry, and an output of the ARB/MUX circuitry is to be provided to the first interface of the adapter.

Example 38 includes the subject matter of any one of examples 35-37, where the first interface includes a Logical PHY Interface Specification (LPIF) interface, and the PHY device is protocol agnostic.

Example 39 includes the subject matter of example 38, where the adapter further includes state machine circuitry to implement at least a portion of a state machine defined by the link-layer-to-PHY interface standard.

Example 40 includes the subject matter of example 39, where the state machine defines transitions between a plurality of link states, and the sideband messages are to be used to coordinate transitions between the plurality of link states between the adapter and the other adapter.

Example 41 includes the subject matter of any one of examples 33-40, where the data channel includes a first set of pins and the sideband channel includes a different second set of pins.

Example 42 includes the subject matter of any one of examples 33-41, where the particular device includes one of a link layer controller or a multiplexer to multiplex data of a plurality of link layers.

Example 43 includes the subject matter of example 42, where the particular device includes a plurality of link layer controllers to implement link layers of a plurality of different interconnect protocols.

Example 44 includes the subject matter of example 43, where the plurality of different interconnect protocols includes a Peripheral Component Interconnect Express (PCIe)-based protocol.

Example 45 includes the subject matter of any one of examples 43-44, where the plurality of different interconnect protocols includes two or more of a Compute Express Link (CXL) memory protocol, CXL cache protocol, or CXL I/O protocol.

Example 46 includes the subject matter of any one of examples 33-45, where the link is to couple a first die to a second die, the first die is to include the adapter and the second die is to include the other adapter.

Example 47 includes the subject matter of any one of examples 33-46, where the second interface further includes a valid channel to indicate that valid data is being sent over the second interface.

Example 48 includes the subject matter of example 47, where the valid channel is to be asserted to indicate that either valid data is being sent on the data channel or valid sideband messages are being sent on the sideband channel.

Example 49 includes the subject matter of any one of examples 33-48, where the second interface further includes a stream channel to carry a stream signal to identify a particular protocol used by data sent on the data channel.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
    an adapter comprising:
        a first interface to couple to a particular device, wherein link layer data is to be communicated over the first interface;
        a second interface to couple to a physical layer (PHY) device, wherein the PHY device comprises a plurality of wires to implement a physical layer of a die-to-die link, the die-to-die link couples the adapter to another adapter on another die via the PHY device, and the second interface comprises:
            a data channel to communicate the link layer data over the physical layer; and
            a sideband channel to communicate sideband messages between the adapter and the other adapter over the physical layer; and
            circuitry to implement a logical PHY for the die-to-die link.

2. The apparatus of claim 1, wherein the data channel comprises a first set of pins and the sideband channel comprises a different second set of pins.

3. The apparatus of claim 1, wherein the particular device comprises one of a link layer controller or a multiplexer to multiplex data of a plurality of link layers.

4. The apparatus of claim 1, wherein the die-to-die link is to couple a first die to the other die, the first die is to comprise the adapter and the other die is to comprise the other adapter.

5. The apparatus of claim 1, wherein the first interface is according to a link-layer-to-PHY interface standard.

6. The apparatus of claim 5, wherein the second interface is to adapt data of the common link layer-to-PHY interface for transfer over the die-to-die link.

7. The apparatus of claim 1, wherein the second interface further comprises a valid channel is to be asserted to indicate that either valid data is being sent on the data channel or valid sideband messages are being sent on the sideband channel.

8. The apparatus of claim 1, wherein the second interface further comprises a stream channel to carry a stream signal to identify a particular protocol used by data sent on the data channel.

9. The apparatus of claim 5, wherein the link-layer-to-PHY interface standard comprises a Logical PHY Interface Specification (LPIF) interface.

10. The apparatus of claim 5, wherein the adapter further comprises state machine circuitry to implement at least a portion of a state machine defined by the link-layer-to-PHY interface standard.

11. The apparatus of claim 10, wherein the state machine defines transitions between a plurality of link states, and the sideband messages are to be used to coordinate transitions between the plurality of link states between the adapter and the other adapter.

12. A method comprising:
    receiving particular data at a first interface of an adapter device, wherein the first interface is based on a link-layer-to-PHY interface standard, and the particular data is based on the link-layer-to-PHY interface standard and indicates a request to transition to an active link state defined in a state machine;
    sending a request sideband signal on a second interface of the adapter device, wherein the second interface couples the adapter device to a PHY device, the second interface comprises a data channel and a separate sideband channel, the PHY device comprises a plurality of physical connectors to implement a physical layer of a link, and the request sideband signal is to be sent to another adapter device coupled to the PHY device and indicates a request to enter the active link state;
    receiving an acknowledgement sideband signal on the sideband channel of the second interface from the other adapter device to acknowledge the request to enter the active link state;
    sending a signal on the first interface to indicate that the adapter device is prepared to receive link layer data to communicate on the link;
    receiving the link layer data; and
    transmitting the link layer data on the data channel of the second interface to transmit the link layer data to the other adapter device over the PHY device based on entry to the active link state.

13. The method of claim 12, further comprising:
    receiving a request sideband signal on the sideband channel of the second interface, wherein the received request sideband signal indicates a request to enter a low power link state;
    communicating a set of signals on the first interface to initiate clock gating based on the request to enter the low power link state;
    sending an acknowledgement sideband signal on the sideband channel of the second interface to acknowledge the request to enter the low power link state; and
    transitioning from the active link state to the low power link state on the adapter.

14. The method of claim 13, wherein the PHY device is to remain in an active state after the adapter transitions to the low power link state.

15. A system comprising:
    a first die comprising:
        link layer circuitry to implement a link layer of a protocol;
        an adapter comprising:
            a first interface, wherein link layer data associated with the link layer circuitry is to be communicated over the first interface;
            a second interface to couple to a physical layer (PHY) device, wherein the PHY device comprises a plurality of wires to implement a physical layer of a link, the link is to couple the first die to a second die via the PHY device, and the second interface comprises:
                a data channel to communicate the link layer data to the PHY device for communication on the link; and
                a sideband channel to communicate sideband messages between the adapter and another adapter on the second die; and
            circuitry to implement a logical PHY for the link.

16. The system of claim 15, further comprising:
    the PHY device; and
    the second die, wherein the second die comprises the other adapter, and the other adapter comprises a respective data channel and a respective sideband channel to couple to the PHY device.

17. The system of claim 15, wherein the link layer circuitry comprises first link layer circuitry to implement a link layer of a first interconnect protocol, and the first die further comprises second link layer circuitry to implement a link layer of a different, second interconnect protocol.

18. The system of claim 17, wherein the adapter comprises a first adapter, and the die comprises a second adapter to be coupled between the second link layer circuitry and the physical layer of the link, wherein the second adapter implements at least a portion of the logical PHY for the link.

19. The system of claim 17, wherein the first die further comprises arbitration/multiplexing (ARB/MUX) circuitry to couple to each of the first and second link layer circuitry, and an output of the ARB/MUX circuitry is to be provided to the first interface of the adapter.

20. The system of claim 17, wherein the first interface comprises a Logical PHY Interface Specification (LPIF) interface, and the PHY device is protocol agnostic.

* * * * *